United States Patent [19]
Yano et al.

[11] Patent Number: 5,732,053
[45] Date of Patent: Mar. 24, 1998

[54] INFORMATION RECORDING METHOD INFORMATION RECORDING APPARATUS

[75] Inventors: Koji Yano, Zama; Hisaaki Kawade, Yokohama; Etsuro Kishi, Sagamihara; Kiyoshi Takimoto, Isehara, all of Japan

[73] Assignee: Canon Kabushiki Kaisha, Tokyo, Japan

[21] Appl. No.: 697,253

[22] Filed: Aug. 21, 1996

Related U.S. Application Data

[63] Continuation of Ser. No. 207,418, Mar. 8, 1994, abandoned.

[30] Foreign Application Priority Data

| Mar. 9, 1993 | [JP] | Japan | 5-048305 |
| Apr. 23, 1993 | [JP] | Japan | 5-098021 |
| Nov. 22, 1993 | [JP] | Japan | 5-292229 |

[51] Int. Cl.$^6$ ................................. G11B 7/00
[52] U.S. Cl. .................... 369/54; 369/126; 250/306
[58] Field of Search ........................ 369/54, 58, 59, 369/47, 48, 126; 250/306, 307

[56] References Cited

U.S. PATENT DOCUMENTS

| 4,575,822 | 3/1986 | Quate | 369/126 |
| 5,144,581 | 9/1992 | Toda et al. | 369/126 X |
| 5,202,879 | 4/1993 | Oguchi et al. | 369/126 |
| 5,289,455 | 2/1994 | Kuroda et al. | 369/126 |
| 5,375,114 | 12/1994 | Hatanaka et al. | 369/126 |

FOREIGN PATENT DOCUMENTS

| 0438256 | 7/1991 | European Pat. Off. |
| 0469565 | 2/1992 | European Pat. Off. |
| 0519745 | 12/1992 | European Pat. Off. |
| 0523676 | 1/1993 | European Pat. Off. |
| 61-80536 | 4/1986 | Japan |
| 63-096956 | 4/1988 | Japan |
| 63-161552 | 7/1988 | Japan |
| 63-161553 | 7/1988 | Japan |

OTHER PUBLICATIONS

Patent Abstracts of Japan, vol. 16, No. 492, published Oct. 12, 1992, English Abstract of Japanese Patent No. 4-180261.

Physical Review Letter, "Surface Studies by Scanning Tunneling, Microscopy", by G. Binning, et al., vol. 49, No. 1, Jul. 5, 1992, pp. 57-60.

*Primary Examiner*—Muhammad N. Edun
*Attorney, Agent, or Firm*—Fitzpatrick, Cella, Harper & Scinto

[57] ABSTRACT

A physical action such as voltage or the like is locally applied to a recording medium in accordance with information to be recorded and a physical quantity such as a current, a voltage, and the like of a portion of the recording medium to which the physical action is applied, is measured. Recording of information is confirmed on the basis of the measured physical quantity.

34 Claims, 21 Drawing Sheets

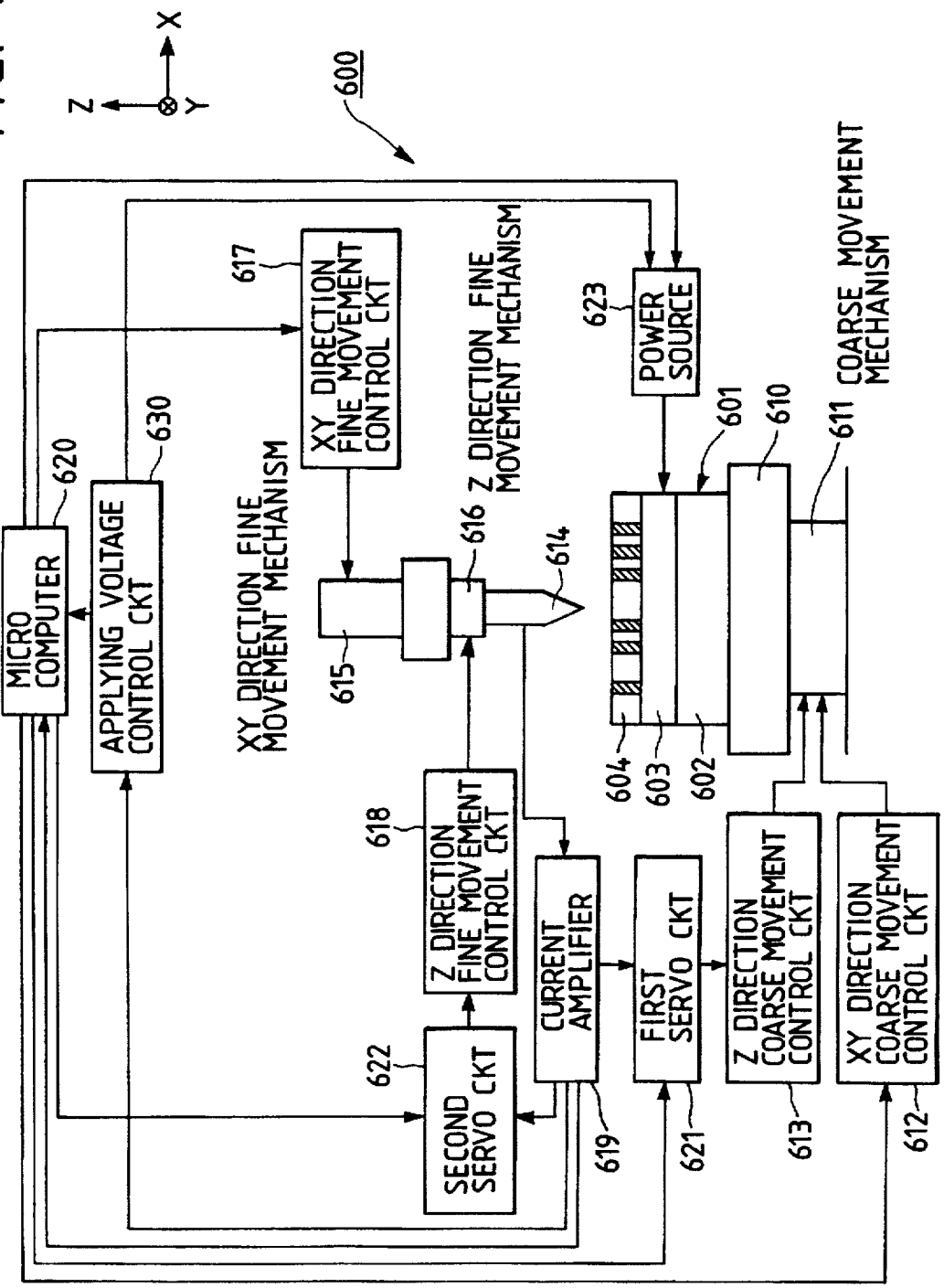

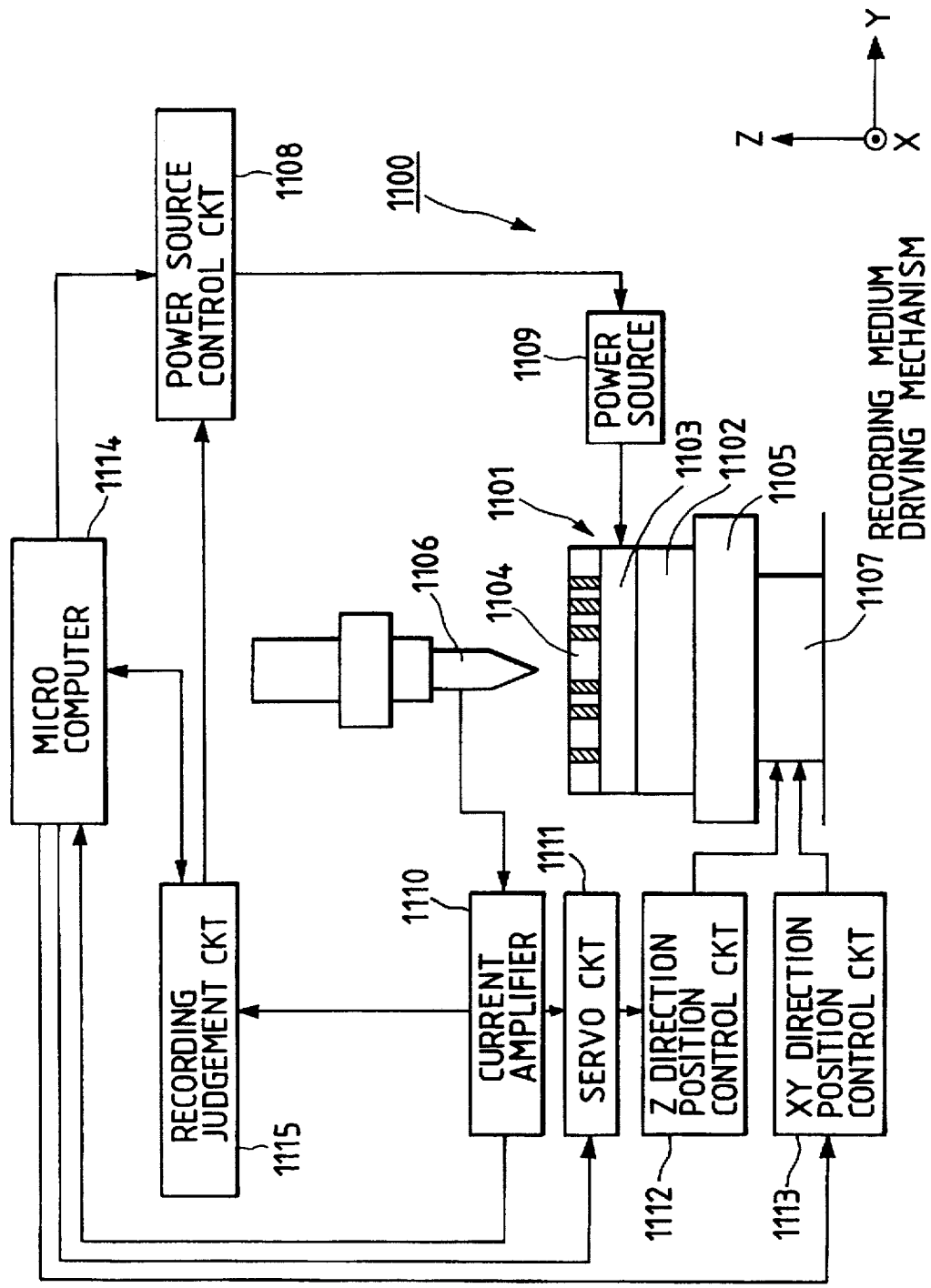

INFORMATION RECORDING METHOD INFORMATION RECORDING APPARATUS

This application is a continuation of application Ser. No. 08/207,418 filed Mar. 8, 1994, now abandoned.

BACKGROUND OF THE INVENTION

1. Field of the Invention

The present invention relates to an information recording method and an information recording apparatus. Note that the information recording apparatus of the present invention includes one having a reproduction function.

2. Related Background Art

As a recording method for recording bit information, a magnetic recording method using a magnetic tape, a magnetic disk, or the like, an electrical recording method using a semiconductor element, and the like are known. In recent years, the requirements for large capacity recording, a high-speed recording operation, and a decreased error rate have become strong with an increase in amount of information to be recorded.

In such a situation, an element which has a metal-organic insulating film-metal structure in which an organic thin film (e.g., a thin film of a π-electron-based organic compound, a chalcogenide, or the like) is sandwiched between metal electrodes, and exhibits a memory effect with respect to the switching characteristics of a voltage current (to be referred to as an "MIM" element hereinafter) was developed (Japanese Laid-Open Patent Application No. 63-096956). In such an MIM element, when a proper pulse voltage is applied across the metal electrodes, the conductivity of the element can be reversibly changed. Therefore, by utilizing this switching phenomenon, information can be recorded in the MIM element. In addition, in this switching phenomenon, the switching speed is very high.

FIG. 1 is a schematic diagram showing a conventional recording apparatus utilizing the MIM element.

A recording apparatus 2010 includes a recording medium 2011, a current amplifier 2012, and a recording voltage generating circuit 2013. The recording medium 2011 includes a lower electrode $2011_1$, an upper electrode $2011_2$, and a recording layer $2011_3$ which is arranged between the upper and lower electrodes $2011_2$ and $2011_1$, and consists of an LB film having different conductivities ρ between a non-recording state and a recording state. More specifically, the recording medium 2011 has the element structure of the above-mentioned MIM element. The recording voltage generating circuit 2013 generates a recording voltage (recording pulse voltage), and applies the generated recording voltage across the lower and upper electrodes $2011_1$ and $2011_2$, thereby applying the recording voltage to the recording layer $2011_3$. The current amplifier 2012 detects and amplifies a current flowing between the lower and upper electrodes $2011_1$ and $2011_2$ during the application of the recording voltage.

The operation of the recording apparatus 2010 will be described below. A case will be discussed wherein the conductivity ρ of the recording layer $2011_3$ is increased by applying a recording voltage to the recording layer $2011_3$ which has a small conductivity ρ in a non-recording state, and information is thus recorded.

The recording voltage generating circuit 2013 applies a recording voltage (recording pulse voltage) of a voltage value $V_0$ to the recording layer $2011_3$ from $t_1$ to time $t_2$, as shown in FIG. 2A. At this time, the conductivity ρ of the recording layer $2011_3$ changes from a small conductivity $ρ_L$ to a large conductivity $ρ_H$ at the time $t_3$ ($t_1<t_3<t_2$), as shown in FIG. 2B. Therefore, the current value increases at time $t_3$ in the current waveform detected by the current amplifier 2013. In contrast to this, the conductivity ρ often does not change within a predetermined period of time or by the predetermined voltage value $V_0$ due to a variation in the element constituting the recording layer $2011_3$. In this case, the current waveform detected by the current amplifier 2012 has a constant current value from time $t_1$ to time $t_2$, as shown in FIG. 2C.

In recent years, a scanning tunneling microscope (STM) which allows observation of a material surface on the atomic order has been developed, thereby permitting real space observation at atomic and molecular levels (G. Binning et al., Phys. Rev. Lett, 49, 57, 1982). In the scanning tunneling microscope, the distal end (tip) of a probe electrode is two-dimensionally scanned while controlling the distance between the tip and a conductive sample, so that the value of a tunneling current flowing between the tip and the sample becomes constant, and information of a charge cloud on the sample surface or the shape of the sample is observed on the order of subnanometers (atomic order) on the basis of a control signal for controlling the distance between the tip and the sample at that time.

If the principle of such a scanning tunneling microscope is applied, high-density recording/reproduction can be sufficiently realized on the atomic order. For example, in a recording/reproduction apparatus disclosed in Japanese Laid-Open Patent Application No. 61-80536, information is recorded by knocking out atomic particles adsorbed in the surface of a recording medium by, e.g., an electron beam, and recorded information is reproduced by the scanning tunneling microscope. In a recording/reproduction apparatus disclosed in U.S. Pat. No. 4,575,822, an electrical charge is injected into a dielectric formed on the surface of a recording medium using a tunneling current flowing between the tip and the surface of the recording medium, thereby recording information. Furthermore, a method of recording information by a physical or magnetic decay of a recording medium using a laser beam, an electron beam, a particle beam, or the like has also been proposed.

Also, a recording/reproduction method which uses, as a recording layer, the above-mentioned thin film layer consisting of a material exhibiting a memory effect with respect to the switching phenomenon of a current voltage characteristics, and performs recording/reproducing by utilizing the principle of the scanning tunneling microscope has been proposed (Japanese Laid-Open Patent Application No. 63-161552 or 63-161553). According to this recording/reproduction method, if the size of a recording bit is 10 nm, large-capacity recording/reproduction of $10^{12}$ bits/cm² can be realized. For example, a recording/reproduction apparatus 3000 according to this recording/reproduction method includes a recording medium 3001, a recording medium stage 3010, a coarse movement mechanism 3011, an XY direction coarse movement control circuit 3012, a Z direction coarse movement control circuit 3013, a probe electrode 3014, an XY direction fine movement mechanism 3015, a Z direction fine movement mechanism 3016, an XY direction fine movement control circuit 3017, a Z direction fine movement control circuit 3018, a current amplifier 3019, a microcomputer 3020, a first servo circuit 3021, a second servo circuit 3022, and a power source 3032, as shown in FIG. 3. The respective constituting elements of the recording/reproduction apparatus 3000 will be described in detail below.

(1) Recording Medium 3001

As shown in FIG. 3, the recording medium 3001 is constituted by a substrate 3002, a substrate electrode 3003 formed on the substrate 3002, and a recording layer 3004 formed on the substrate electrode 3003. The recording layer 3004 comprises a thin film layer consisting of a material exhibiting a memory effect with respect to the switching phenomenon of the voltage current characteristics.

(2) Recording Medium Stage 3010, Coarse Movement Mechanism 3011, XY Direction Coarse Movement Control Circuit 3012, and Z Direction Coarse Movement Control Circuit 3013

The recording medium stage 3010 carries the recording medium 3001 thereon. The coarse movement mechanism 3011 coarsely moves the recording medium stage 3010 in the X-, Y-, and Z-axis directions in FIG. 3, thereby moving the recording medium 3001 in the X-, Y-, and Z-axis directions in FIG. 3. The XY direction coarse movement control circuit 3012 is controlled by the microcomputer 3020, and drives the coarse movement mechanism 3011 in the X- and Y-axis directions in FIG. 3. The Z direction coarse movement control circuit 3013 drives the coarse movement mechanism 3011 in the Z-axis direction in FIG. 3 in accordance with a coarse movement control signal sent from the first servo circuit 3021.

(3) Probe Electrode 3014, XY Direction Fine Movement Mechanism 3015, Z direction Fine Movement Mechanism 3016, XY direction Fine Movement Control Circuit 3017, and Z direction Fine Movement Control Circuit 3018

The probe electrode 3014 is positioned above the surface of the recording medium 3001. The XY direction fine movement mechanism 3015 finely moves the probe electrode 3014 in the X- and Y-axis directions in FIG. 3, thereby two-dimensionally scanning the probe electrode 3014 with respect to the recording medium 3001. The Z direction fine movement mechanism 3016 finely moves the probe electrode 3014 in the Z-axis direction in FIG. 3, thereby finely adjusting the distance between the probe electrode 3014 and the recording medium 3001. The XY direction fine movement control circuit 3017 is controlled by the microcomputer 3020, and drives the XY direction fine movement mechanism 3015 in the X- and Y-axis directions in FIG. 3. The Z direction fine movement control circuit 3018 drives the Z direction fine movement mechanism 3016 in the Z-axis direction in FIG. 3 in accordance with a fine movement control signal sent from the second servo circuit 3022.

(4) Current Amplifier 3019, Microcomputer 3020, First Servo Circuit 3021, Second Servo Circuit 3022, and Power Source 3023

The current amplifier 3019 detects and amplifies a current flowing between the probe electrode 3014 and the recording medium 3001, and outputs the amplified current to the microcomputer 3020, and the first and second servo circuits 3021 and 3022. The first servo circuit 3021 compares the value of the current sent from the current amplifier 3019 with a first current setting value, supplied from the microcomputer 3020, for maintaining a predetermined distance between the probe electrode 2014 and the recording layer 3004, and outputs a coarse movement control signal for performing coarse movement control of the distance between the probe electrode 3014 and the recording medium 3001 to the Z direction coarse movement control circuit 3013. The second servo circuit 3022 compares the value of the current sent from the current amplifier 3019 with a second current setting value, supplied from the microcomputer 3020, for maintaining the predetermined distance between the probe electrode 2014 and the recording layer 3004, and outputs a fine movement control signal for performing fine movement control of the distance between the probe electrode 3014 and the recording medium 3001 to the Z direction fine movement control circuit 3018. The power source 3023 applies, between the recording medium 3001 and the probe electrode 3014, a recording bias voltage and a recording pulse voltage in a recording mode, a reproduction bias voltage in a reproduction mode, and an erasing bias voltage and an erasing pulse voltage in an erasing mode. The microcomputer 3020 controls the XY direction coarse movement control circuit 3012, the, XY direction fine movement control circuit 3017, and the power source 3023, and outputs the above-mentioned first and second current setting values to the first and second servo circuits 3021 and 3022, respectively.

The recording and reproduction operations of the recording/reproduction apparatus 3000 will be described below.

In the recording mode, the power source 3023 is controlled by the microcomputer 3020 to apply a predetermined bias voltage to the substrate electrode 3003 of the recording medium 3001. Thus, the predetermined bias voltage is applied between the probe electrode 3014 and the recording layer 3004 of the recording medium 3001. At this time, a current flowing between the probe electrode 3014 and the recording layer 3004 is detected and amplified by the current amplifier 3019, and the amplified current is sent to the microcomputer 3020, and the first and second servo circuits 3021 and 3022.

The first service circuit 3021 compares the value of the current sent from the current amplifier 3019 with the first current setting value sent from the microcomputer 3020, and outputs, to the Z direction coarse movement control circuit 3013, a coarse movement control signal for performing coarse movement control of the distance between the probe electrode 3014 and the recording layer 3004, so that the two values become equal to each other. The Z direction coarse movement control circuit 3013 generates a signal for driving the coarse movement mechanism 3011 in the Z-axis direction in FIG. 3 on the basis of the coarse movement control signal, and outputs the generated signal to the coarse movement mechanism 3011. With this signal, the distance between the probe electrode 3014 and the recording layer 3004 is coarsely adjusted. The second servo circuit 3022 compares the value of the current sent from the current amplifier 3019 with the second current setting value sent from the microcomputer 3020, and outputs, to the Z direction fine movement control circuit 3018, a fine movement control signal for performing fine movement control of the distance between the probe electrode 3014 and the recording layer 3004, so that the two values become equal to each other. The Z direction fine movement control circuit 3018 generates a signal for driving the Z direction fine movement mechanism 3016 in the Z-axis direction in FIG. 3 on the basis of the fine movement control signal, and outputs the generated signal to the Z direction fine movement mechanism 3016. With this signal, the distance between the probe electrode 3014 and the recording layer 3004 is finely adjusted, i.e., the predetermined distance is maintained.

The XY direction coarse movement control circuit 3012 generates a signal for driving the coarse movement mechanism 3011 in the X- and Y-axis directions in FIG. 3 on the basis of an instruction from the microcomputer 3020, and outputs the generated signal to the coarse movement mechanism 3011. The XY direction fine movement control circuit 3017 generates a signal for driving the XY direction fine movement mechanism 3015 in the X- and Y-axis directions in FIG. 3 on the basis of an instructions from the microcomputer 3020, and outputs the generated signal to the XY direction fine movement mechanism 3015. Thus, the probe electrode 3014 is scanned to the recording position of the recording medium 3001.

The power source 3023 generates a recording bias voltage and a recording pulse voltage on the basis of an instruction from the microcomputer 3020. The recording bias voltage and the recording pulse voltage are applied to the recording layer 3004 via the substrate electrode 3002 of the recording medium 3001. With these voltages, since the conductivity of a portion, to which the recording pulse voltage is applied, of the recording layer 3004 locally changes, a recording bit is formed on the recording layer 3004.

In the reproduction mode, the probe electrode is scanned at the reproduction position of the recording medium 3001 in the same manner as in the recording mode. Thereafter, the power source 3023 generates a reproduction bias voltage. The reproduction bias voltage is applied to the recording layer 3004 via the substrate electrode 3002 of the recording medium 3001. At this time, a current flowing between the probe electrode 3014 and the recording layer 3004 is detected and amplified by the current amplifier 3019, and the amplified current is sent to the microcomputer 3020. The microcomputer 3020 calculates the conductivity of the recording layer 3004 on the basis of the value of the sent current. Since the presence/absence of a recording bit can be detected based on the value of the calculated conductivity, recorded information can be reproduced.

In the above-mentioned conventional recording/reproduction apparatus 3000, when the recording medium 3001 is replaced by a crystal such as silicon, atomic-level recording and processing can be performed. More specifically, the probe electrode 3014 is moved to a recording position where information is to be recorded, and a voltage is applied at the recording position to move one of the atoms on the surface of the recording medium 3001 as a recording bit.

However, the conventional recording apparatus 2010 shown in FIG. 1 suffers from the following problems.

(1) When the predetermined voltage value $V_0$ and the recording pulse voltage of the predetermined pulse width $(t_2-t_1)$ are applied to the recording layer $2011_3$, information can be accurately recorded in some cases, but cannot be accurately recorded in some other cases, resulting in a large recording error rate.

(2) If the pulse width $(t_2-t_1)$ of the recording pulse voltage is increased to assure stable information recording, the operation speed is lowered.

(3) Even when information is accurately recorded, since an excessive current flows during a time interval from time $t_3$ to time $t_2$, as shown in FIG. 2B, the elements constituting the recording layer $2011_3$ may be destroyed.

The conventional recording/reproduction apparatus 3000 shown in FIG. 3 also suffers from the same problems as those of the conventional recording apparatus 2010 shown in FIG. 1.

Furthermore, in a recording apparatus using a scanning tunneling microscope, a recording error may be caused by non-uniformity of a recording medium in the recording mode. In the conventional recording apparatus 2010 shown in FIG. 1, the voltage necessary for changing the conductivity may vary due to a variation in the characteristics between individual devices. When a voltage higher than a required voltage is applied, the LB film may be destroyed.

In a surface atom processing technique or a recording technique using it, a voltage required for processing an atom at or near a defect position is different from an atom present on a normal terrace. If the voltage is too low, atom processing may often be disturbed; if the voltage is too high, the high voltage may also influence unnecessary atoms.

The problem of a recording error caused by non-uniformity depending on recording positions occurs not only when a voltage is applied but also in the surface processing techniques or the recording techniques using the scanning tunnel electrode, e.g., when mechanical processing is performed by bringing the probe into contact with the surface of the recording medium or sample.

This problem also occurs when a recording bit is formed or fine processing is performed using not only the scanning tunnel electrode but also various types of scanning probe microscopes (SPM) such as an interatomic force microscope (AFM).

SUMMARY OF THE INVENTION

It is an object of the present invention to provide an information recording method and an information recording apparatus, which can reliably record information without damaging elements constituting a recording layer.

It is another object of the present invention to provide a recording apparatus, a recording/reproduction apparatus, a recording method, and a recording/reproduction method, which can reliably record information on a recording medium, and can prevent destruction of a recording medium.

It is still another object of the present invention to provide an information recording apparatus and an information recording method, which can reliably process the surface of a material using a scanning probe microscope, and can prevent unnecessary processing.

In order to achieve the above objects, there is provided an information recording method for recording information by locally applying a physical action to a recording medium in accordance with information, comprising the steps of: locally applying the physical action to the recording medium in accordance with information; measuring a physical quantity of a portion, to which the physical action is applied, of the recording medium; and confirming recording of the information on the basis of the measured physical quantity.

There is also provided an information recording apparatus for recording information by locally applying a physical action to a recording medium in accordance with information, comprising: means for locally applying the physical action to the recording medium in accordance with information; means for measuring a physical quantity of a portion, to which the physical action is applied, of the recording medium; and means for confirming recording of the information on the basis of the measured physical quantity.

Note that the physical action in the present invention includes applying a current, a voltage, a force, a magnetic force, light, and the like, and the physical quantity includes a current, voltage, force, magnetic force, light, and the like, and their differential values, integral values, and the like.

BRIEF DESCRIPTION OF THE DRAWINGS

FIGS. 2A to 2C are graphs for explaining the operation of the recording apparatus shown in FIG. 1, in which FIG. 2A is a graph showing the waveform of a recording voltage, FIG. 2B is a graph showing the waveform of a current detected and amplified by a current amplifier obtained when the conductivity of a recording medium shown in FIG. 1 changes, and FIG. 2C is a graph showing the waveform of a current detected and amplified by the current amplifier obtained when the conductivity of the recording medium shown in FIG. 1 does not change;

FIGS. 5A to 5C are equivalent circuit diagrams of a recording medium shown in FIG. 4, in which FIG. 5A shows a general equivalent circuit of the recording medium, FIG. 5B shows an approximate equivalent circuit obtained when the conductivity of the recording medium is small, and FIG. 5C shows an approximate equivalent circuit obtained when the conductivity of the recording medium is large;

FIG. 6A is a graph showing the waveform of a recording pulse voltage, FIG. 6B is a graph showing the waveform of a current detected by the current amplifier when the conductivity of the recording medium increases, and FIG. 6C is a graph showing the waveform of a current detected by the current amplifier when the conductivity of the recording medium does not change;

FIGS. 7A and 7B are schematic views showing the second embodiment of a recording apparatus according to the present invention, in which FIG. 7A is a schematic diagram of the recording apparatus, and FIG. 7B is a side view of a recording medium;

FIGS. 10A and 10B are graphs for explaining the operation of the recording apparatus shown in FIG. 9, in which FIG. 10A is a graph showing the waveform of a recording voltage, and FIG. 10B is a graph showing the waveform of a current detected and amplified by a current amplifier shown in FIG. 9;

FIGS. 11A and 11B are schematic views showing the fifth embodiment of a recording apparatus according to the present invention, in which FIG. 11A is a schematic diagram of the recording apparatus, and FIG. 11B is a left side view of a recording medium;

FIG. 12 is a schematic diagram showing the sixth embodiment of a recording/reproduction apparatus according to the present invention;

FIGS. 13A and 13B are graphs for explaining the operation of the seventh embodiment of a recording/reproduction apparatus according to the present invention, in which FIG. 13A is a graph showing the waveform of a recording voltage, and FIG. 13B is a graph showing the waveform of a current detected and amplified by a current amplifier shown in FIG. 12;

FIGS. 15A and 15B are graphs for explaining the operation of the recording apparatus shown in FIG. 14, in which FIG. 15A is a graph showing the waveform of a recording current, and FIG. 15B is a graph showing the waveform of a voltage detected and amplified by a voltage amplifier shown in FIG. 14;

FIG. 16 is a schematic diagram showing the 11th embodiment of the recording/reproduction apparatus according to the present invention;

FIGS. 17A and 17B are graphs for explaining an example of the operation of the recording/reproduction apparatus shown in FIG. 16, in which FIG. 17A is a graph showing the value of a voltage to be applied to a recording medium in a recording mode, and FIG. 17B is a graph showing the value of a current amplified by a current amplifier;

FIGS. 18A and 18B are graphs for explaining another example of the operation of the recording/reproduction apparatus shown in FIG. 16, in which FIG. 18A is a graph showing the value of a voltage to be applied to the recording medium in the recording mode, and FIG. 18B is a graph showing the value of a current amplified by the current amplifier;

FIGS. 19A and 19B are graphs for explaining still another example of the operation of the recording/reproduction apparatus shown in FIG. 16, in which FIG. 19A is a graph showing the value of a voltage to be applied to the recording medium in the recording mode, and FIG. 19B is a graph showing the value of a current amplified by the current amplifier;

FIGS. 20A and 20B are graphs for explaining still another example of the operation of the recording/reproduction apparatus shown in FIG. 16, in which FIG. 20A is a graph showing the value of a voltage to be applied to the recording medium in the recording mode, and FIG. 20B is a graph showing the value of a current amplified by the current amplifier;

FIGS. 21A to 21E are graphs for explaining the operation of the 12th embodiment of a recording/reproduction apparatus according to the present invention, which FIG. 21A is a graph showing the value of a voltage to be applied to a recording medium in a recording mode, FIG. 21B is a graph showing an example of the value of a current amplified by a current amplifier, FIG. 21C is a graph showing another example of the value of a current amplified by a current amplifier, FIG. 21D is a graph showing the differential value of the current shown in FIG. 21B, and FIG. 21E is a graph showing the differential value of the current shown in FIG. 21C;

FIGS. 23A to 23F are views for explaining the operation of the recording/reproduction apparatus shown in FIG. 22, in which FIG. 23A is a graph showing the result of an experiment for obtaining the relationship between the position, in the Z-axis direction in FIG. 22, of a recording medium driving mechanism, and the deflection amount detected by a deflection amount detector, and FIGS. 23B and 23F are views showing interpretations of a force curve shown in FIG. 23A; and FIGS. 24A and 24B are graphs for explaining the operation of the recording/reproduction apparatus shown in FIG. 22, in which FIG. 24A is a graph showing a change, over time, in deflection amount detected by the deflection amount detector, and FIG. 24B is a graph showing a change, over time, in the position, in the Z-axis direction in FIG. 22, of the recording medium driving mechanism.

DETAILED DESCRIPTION OF THE PREFERRED EMBODIMENTS

The preferred embodiments of the present invention will be described hereinafter with reference to the accompanying drawings.

[First Embodiment]

Figure 4:
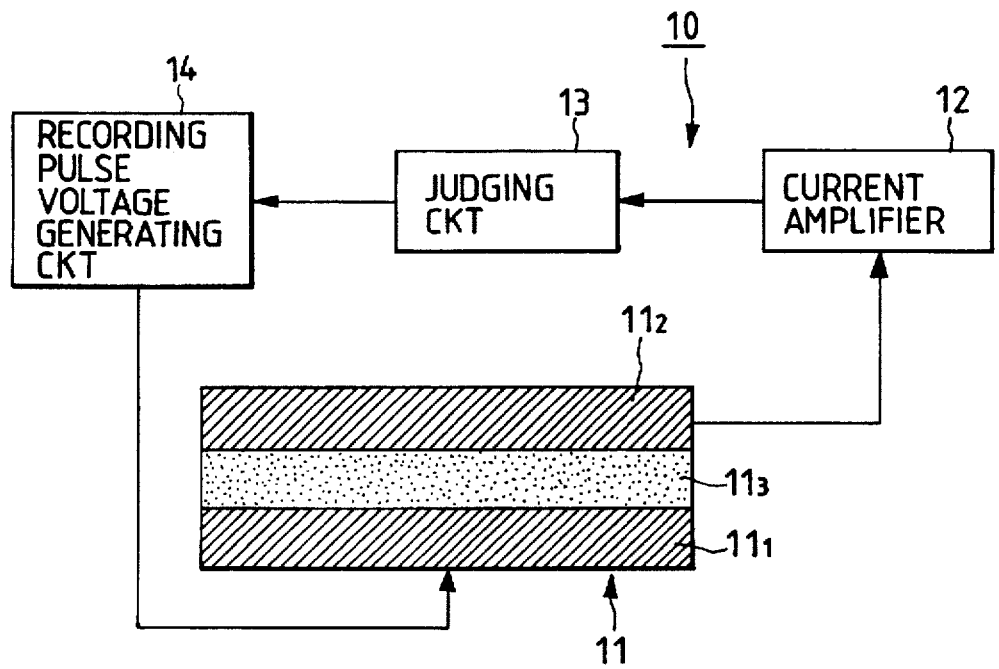
FIG. 4 is a schematic diagram showing the first embodiment of a recording apparatus according to the present invention.

FIG. 4 is a schematic diagram showing the first embodiment of a recording apparatus according to the present invention.

A recording apparatus 10 includes a recording medium 11, a current amplifier 12, a determining circuit 13, and a recording pulse voltage generating circuit 14. The recording medium 11 includes a lower electrode $11_1$, an upper electrode $11_2$, and a recording layer $11_3$ which is formed between the upper and lower electrodes $11_2$ and $11_1$, and whose conductivity changes upon application of a voltage. More specifically, the recording medium 11 has the element structure of the above-mentioned MIM element. The recording pulse voltage generating circuit 14 generates a recording pulse voltage, and applies the generated recording pulse voltage across the lower and upper electrodes $11_1$ and $11_2$. The current amplifier 12 detects and amplifies a current flowing between the lower and upper electrodes $11_1$ and $11_2$ at the time of application of the recording voltage and after application of the recording voltage. The determining circuit 13 determines based on the value of a current sent from the current amplifier 12 whether or not information is accurately recorded. If the determining circuit 13 determines that information is not accurately recorded, it supplies an instruction to the recording pulse voltage generating circuit 14 so as to apply the recording pulse voltage across the lower and upper electrodes $11_1$ and $11_2$ again.

Figure 5A:
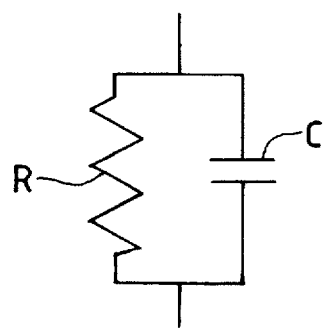
Figure 5B:
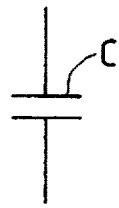
Figure 5C:
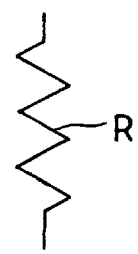

The equivalent circuit of the recording medium 11 when viewed from the recording pulse voltage generating circuit 14 is expressed by a parallel circuit of an element resistor R and a capacitor C, as shown in FIG. 5A. Note that the capacitor C includes the capacitance of a connection cable, and the like. The resistance of the element resistor R corresponds to the reciprocal number of a conductivity $\rho$ of the recording medium 11. Therefore, when the conductivity $\rho$ of the recording medium is small ($\rho=\rho_L$), since the capacitor C becomes dominant, the equivalent circuit of the recording medium 11 is approximately expressed by only the capacitor C, as shown in FIG. 5B. When the conductivity $\rho$ of the recording medium is large ($\rho=\rho_H$), since the element resistor R becomes dominant, the equivalent circuit of the recording medium 11 is approximately expressed by only the element resistor R, as shown in FIG. 5C.

Figure 6A:
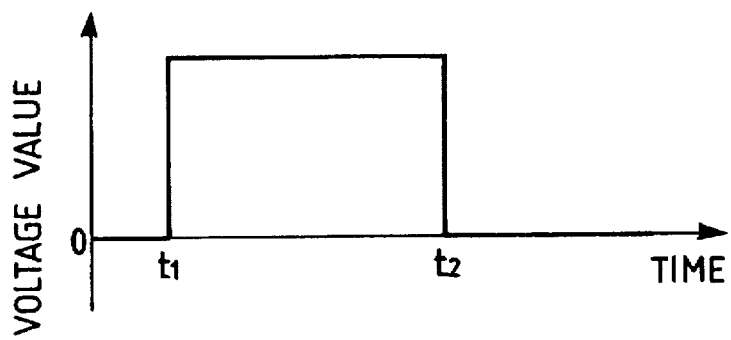
FIGS. 6A to 6C are graphs showing the waveforms of a current to be detected by a current amplifier shown in FIG. 4.

A case will be examined below wherein information is recorded by increasing the conductivity $\rho$ of the recording medium 11 by applying a recording pulse voltage to the recording medium 11 in a state with a small conductivity $\rho$. As shown in FIG. 6A, by applying the recording pulse voltage to the recording medium 11 from time $t_1$ to time $t_2$, the conductivity $\rho$ of the recording medium 11 changes from a small conductivity $\rho_L$ to a large conductivity $\rho_H$. At this time, the equivalent circuit of the recording medium 11 is approximately expressed by only the capacitor C, as shown in FIG. 5B. Therefore, in the waveform of a current detected by the current amplifier 12, a current for charging the capacitor C instantaneously flows at time $t_1$, and thereafter, exponentially decreases, as shown in FIG. 6B.

Thereafter, since the conductivity $\rho$ of the recording medium 11 changes from the small conductivity $\rho_L$ to the large conductivity $\rho_H$ before the time $t_2$, the electrical charge accumulated on the capacitor C is discharged via the recording layer $11_3$ of the recording medium 11, and at the same, a current flows. In contrast to this, when the conductivity $\rho$ of the recording medium 11 is left unchanged from the small conductivity $\rho_L$ upon application of the recording pulse voltage, the equivalent circuit of the recording medium 11 remains to be expressed approximately by only the capacitor C, as shown in FIG. 5B. Therefore, in the waveform of a current detected by the current amplifier 12 at that time, a discharge current generated when the electrical charge accumulated on the capacitor C flows from the lower and upper electrodes $11_1$ and $11_2$ into the current amplifier 12 instantaneously flows at time $t_2$ at which application of the recording pulse voltage is stopped, and thereafter, the current exponentially decreases, as shown in FIG. 6C. Therefore, whether or not the conductivity $\rho$ of the recording medium changes, i.e., whether or not information is accurately recorded can be determined based on the presence/absence of this discharge current.

Figure 6B:
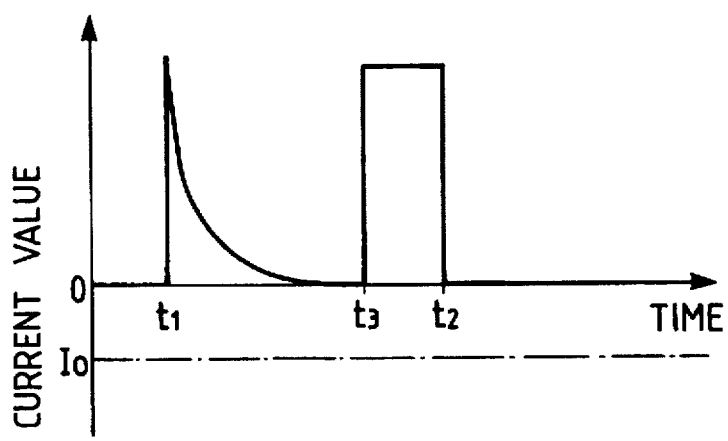
Figure 6C:
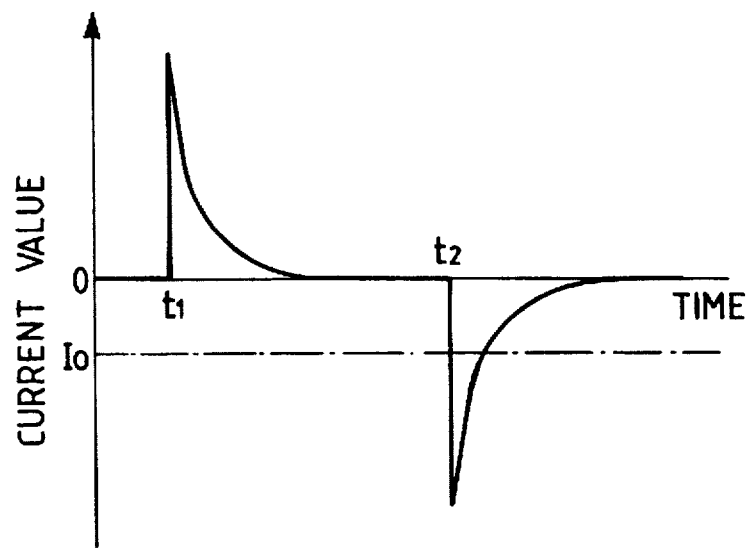

Thus, in the determining circuit 13, as shown in FIGS. 6B and 6C, a reference current value $I_0$ is set in a direction to generate the discharge current. When a current exceeding the reference current value $I_0$ is supplied from the current amplifier 12 after application of the recording pulse voltage, it is determined that information is not accurately recorded. In this case, the determining circuit 13 outputs, to the recording pulse voltage generating circuit 14, an instruction for applying the recording pulse voltage to the recording medium 11 again. Note that the reference current value $I_0$ can be set to be a value capable of suppressing an erroneous operation.

Next, a case will be examined below wherein information is recorded by decreasing the conductivity $\rho$ of the recording medium 11 by applying a recording pulse voltage to the recording medium 11 in a state with a large conductivity $\rho_H$. When the conductivity $\rho$ changes from a large conductivity $\rho_H$ to a small conductivity $\rho_L$ upon application of the recording pulse voltage, since the relative capacitance of the capacitor C in the equivalent circuit of the recording medium 11 increases, the effect of the capacitor C becomes conspicuous. Therefore, immediately after the recording voltage is applied (at the time of application of the recording pulse voltage), the current amplifier 12 detects a discharge current of the electrical charge accumulated on the capacitor C. In contrast to this, when the conductivity $\rho$ of the recording medium 11 does not change upon application of the recording pulse voltage, the effect of the capacitor C does not appear, and the current amplifier 12 does not detect any discharge current at the time of application of the recording pulse voltage. Therefore, in the determining circuit 13, the reference current value $I_0$ is set in the direction to generate the discharge current. When a current exceeding the reference current value $I_0$ is not supplied from the current amplifier 12 at the time of application of the recording pulse voltage, the determining circuit 13 determines that information is not accurately recorded, thus determining whether or not information can be accurately recorded. When the determining circuit 13 determines that information is not accurately recorded, the determining circuit 13 outputs, to the recording pulse voltage generating circuit 14, an instruction for applying the recording pulse voltage to the recording medium 11 again.

As described above, in the recording apparatus 10 of this embodiment, since application of a recording voltage to the recording medium 11 can be automatically repeated until information is accurately recorded, the error rate in the recording mode can be greatly decreased.

The first embodiment of a recording/reproduction apparatus according to the present invention will be described below.

The recording apparatus 10 shown in FIG. 4 has only a recording function. A recording/reproduction apparatus also having a reproduction function can be realized by adding, to the apparatus 10, a means for applying a reproduction voltage (reproduction bias voltage) across the lower and upper electrodes $11_1$ and $11_2$ of the recording medium 11 in a reproduction mode, and an information reproduction means for reproducing information from a current sent from the current amplifier 12.

[Second Embodiment]

The second embodiment of a recording apparatus according to the present invention will be described below with reference to FIGS. 7A and 7B.

A recording apparatus 50 includes a recording medium 51, a recording pulse voltage generating circuit 52, a lower electrode selecting circuit 53, an upper electrode selecting circuit 54, a current amplifier 55, a determining circuit 56, and a microcomputer 57. The respective constituting elements of the recording apparatus 50 will be described below.

(1) Recording Medium 51

The recording medium 51 includes a lower electrode group (lower electrodes $51_{11}$ to $51_{18}$ which are formed to be parallel to each other), an upper electrode group (upper electrodes $51_{21}$ to $51_{28}$ which are formed to be parallel to each other, and to be perpendicular to the lower electrode group), and a recording layer $51_3$ consisting of an LB film which is formed between the upper and lower electrode groups, and whose conductivity locally changes upon application of a voltage.

(2) Recording Pulse Voltage Generating Circuit 52, Lower Electrode Selecting Circuit 53, and Upper Electrode Selecting Circuit 54

The recording pulse voltage generating circuit 52 generates a recording bias voltage in accordance with an instruction sent from the microcomputer 57, and also generates a recording pulse voltage in accordance with an instruction sent from the determining circuit 56. The lower electrode selecting circuit 53 selects one of the lower electrode group (lower electrodes $51_{11}$ to $51_{18}$), and connects the selected electrode to the recording pulse voltage generating circuit 52. The upper electrode selecting circuit 54 selects one of the upper electrode group (upper electrodes $51_{21}$ to $51_{28}$), and connects the selected electrode to the current amplifier 55.

(3) Current Amplifier 55

The current amplifier 55 detects and amplifies a current flowing between the lower electrode selected by the lower electrode selecting circuit 53 and the upper electrode selected by the upper electrode selecting circuit 54 at the time of application of a recording pulse voltage, and after application of a recording pulse voltage.

(4) Determining Circuit 56

The determining circuit 56 determines based on the value of a current sent from the current amplifier 55 whether or not information is accurately recorded. If the determining circuit 56 determines that information is not accurately recorded, it supplies an instruction to the recording pulse voltage generating circuit 52 to generate a recording pulse voltage again.

(5) Microcomputer 57

The microcomputer 57 controls the recording pulse voltage generating circuit 52, the lower electrode selecting circuit 53, and the upper electrode selecting circuit 54.

The operation of the recording apparatus 50 will be described below.

When the microcomputer 57 outputs an instruction for generating a recording pulse voltage to the recording pulse voltage generating circuit 52, a recording pulse voltage is generated by the recording pulse voltage generating circuit 52. The microcomputer 57 outputs an instruction for selecting a lower electrode to which the recording pulse voltage is to be applied (e.g., the lower electrode $51_{11}$ at the left end in FIG. 7A) to the lower electrode selecting circuit 53, and also outputs an instruction for selecting an upper electrode corresponding to an information recording position (e.g., the upper electrode $51_{21}$ at the upper end in FIG. 7A) to the upper electrode selecting circuit 54. Thus, the recording pulse voltage is applied between the lower electrode $51_{11}$ selected by the lower electrode selecting circuit 53, and the upper electrode $51_{21}$ selected by the upper electrode selecting circuit 54, thereby recording information on the recording layer $51_3$.

A current flowing between the lower electrode $51_{11}$ selected by the lower electrode selecting circuit 53, and the upper electrode $51_{21}$ selected by the upper electrode selecting circuit 54 is detected and amplified by the current amplifier 55. Thereafter, the amplified current is sent to the determining circuit 56. The determining circuit 56 determines, using the current sent from the current amplifier 55, whether or not information is accurately recorded, by the same method as in the determining circuit 13 shown in FIG. 4. If it is determined that information is accurately recorded, information indicating that information is accurately recorded is sent from the determining circuit 56 to the microcomputer 57. Upon reception of this information from the determining circuit 56, the microcomputer 57 outputs an instruction for selecting a lower electrode to which the recording pulse voltage is to be applied (e.g., the second lower electrode $51_{12}$ from the left end in FIG. 7A) to the lower electrode selecting circuit 53, and also outputs an instruction for selecting an upper electrode corresponding to an information recording position (e.g., the upper electrode $51_{21}$ at the upper end in FIG. 7A) to the upper electrode selecting circuit 54, so as to select the next recording position. On the other hand, if it is determined that information is not accurately recorded, information indicating that information is to be recorded again is output from the determining circuit 56 to the microcomputer 57. Upon reception of this information from the determining circuit 56, the microcomputer 57 stops the operation for selecting the next recording position. An instruction for generating a recording pulse voltage again is output from the determining circuit 56 to the recording pulse voltage generating circuit 52. Thus, information is recorded again at the same position on the recording layer $51_3$. Upon repetition of the above-mentioned operation, information is two-dimensionally recorded on the recording medium 51.

Therefore, in the recording apparatus 50, since a recording pulse voltage is repetitively applied until information is accurately recorded, the error rate upon formation of a recording bit can be greatly decreased. As for the erasing operation in the recording apparatus 50, information recorded on the recording medium 51 can be stably erased by performing the same operation as the above-mentioned recording operation.

The second embodiment of a recording/reproduction apparatus according to the present invention will be described below.

Figure 7A:
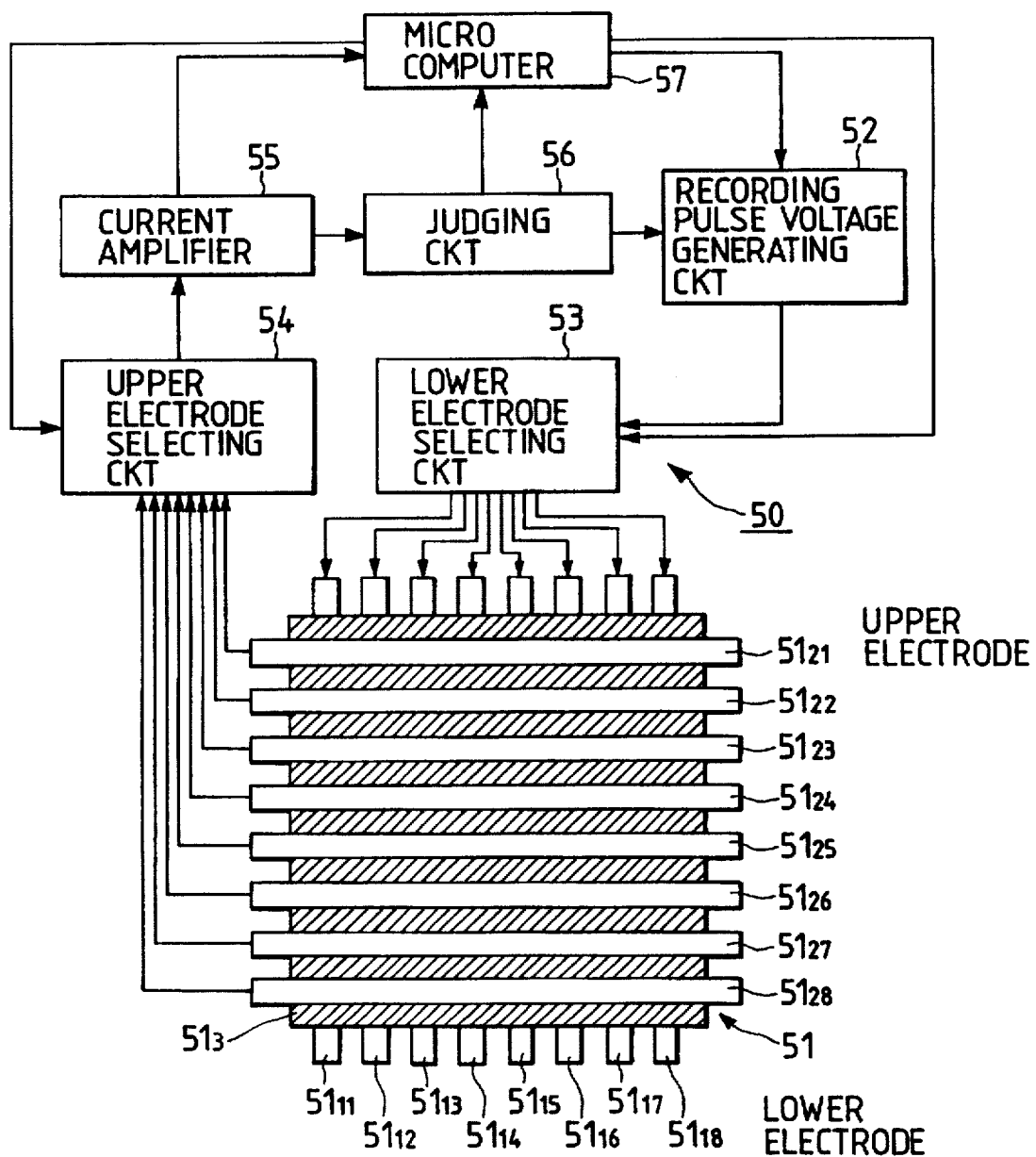
Figure 7B:
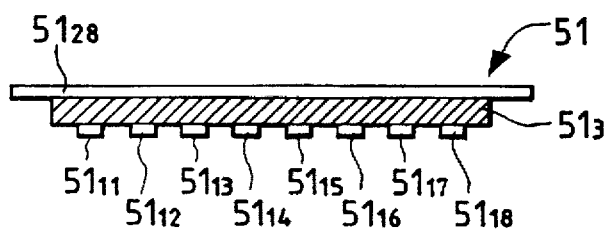

The recording apparatus 50 shown in FIGS. 7A and 7B has only a recording function. However, by adding the following functions to be recording pulse voltage generating circuit 52 and the microcomputer 57, a recording/reproduction apparatus also having a reproduction function can be realized.

(1) A function for generating a reproduction voltage in a reproduction mode is added to the recording pulse voltage generating circuit 52.

(2) A function for outputting an instruction for selecting a lower electrode, to which a reproduction voltage is to be applied, to the lower electrode selecting circuit 53, and outputting an instruction for selecting an upper electrode corresponding to an information reproduction position to the upper electrode selecting circuit 54 in the reproduction mode, and a function for reproducing information based on a current sent from the current amplifier 55 in the reproduction mode are added to the microcomputer 57.

In place of adding the function for generating a reproduction voltage in the reproduction mode to the recording pulse voltage generating circuit 52 described in (1) above, means for generating a reproduction voltage in the reproduction mode may be separately arranged.

[Third Embodiment]

The third embodiment of a recording/reproduction apparatus according to the present invention will be described below with reference to FIG. 8.

Figure 3:
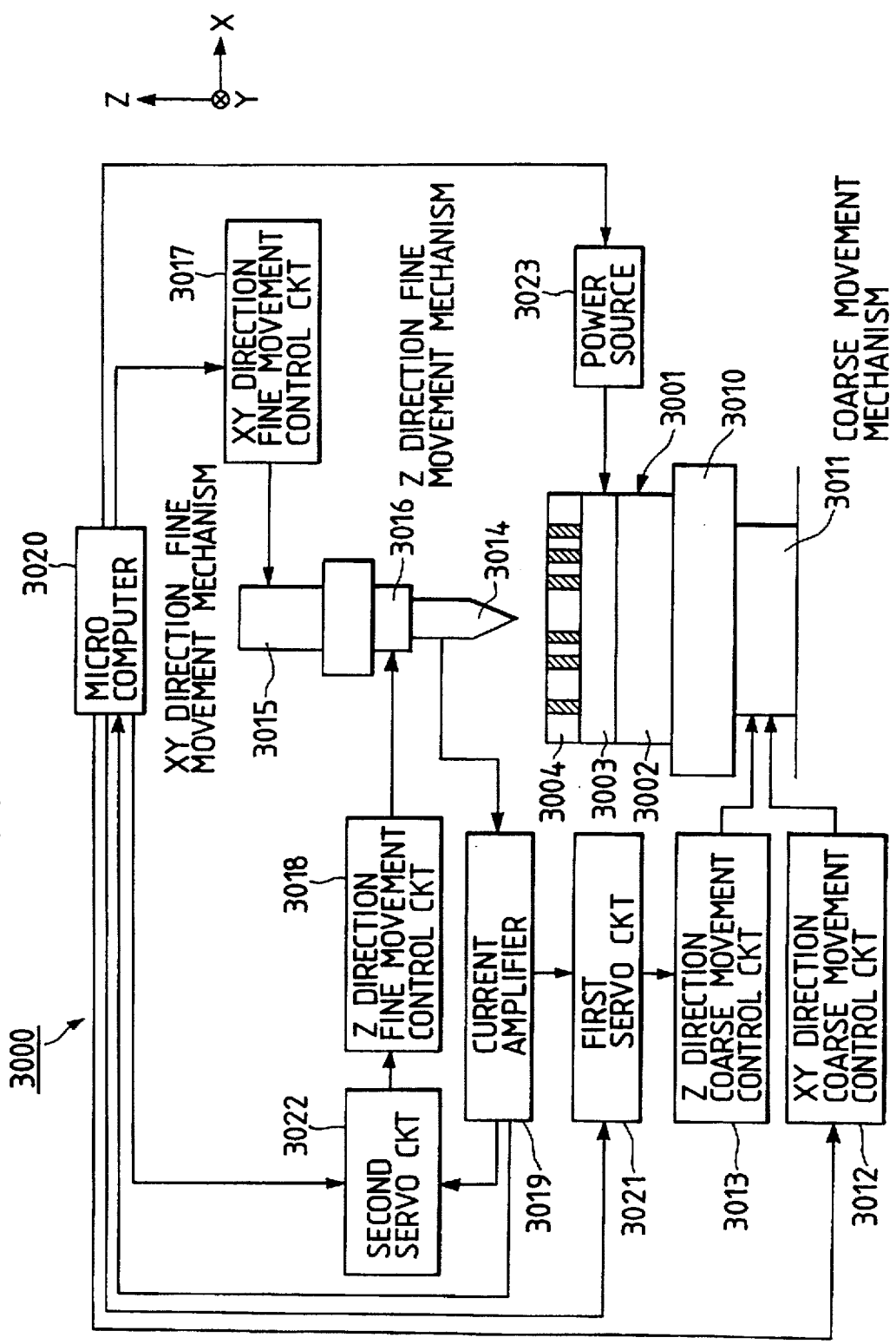
FIG. 3 is a schematic diagram showing a prior art of a recording/reproduction apparatus.

A difference between a recording/reproduction apparatus 100 and the conventional recording/reproduction apparatus 3000 shown in FIG. 3 is that the apparatus 100 comprises a determining circuit 130 for determining based on the value of a current detected by a current amplifier 119 whether or not information is accurately recorded, and for, when it is determined that information is not accurately recorded, supplying an instruction for applying a recording voltage again between a recording medium 101 and a probe electrode 114 to a power source 123.

The recording and reproduction operations of the recording/reproduction apparatus 100 will be described below.

In a recording mode, the power source 123 applies a predetermined bias voltage to a substrate electrode 103 of the recording medium 101 under the control of a microcomputer 120. Thus, the predetermined bias voltage is applied between the probe electrode 114 and a recording layer 104 of the recording medium 101. A current detected by the probe electrode 114 at that time (i.e., a current flowing between the probe electrode 114 and the recording layer 104) is amplified by the current amplifier 119, and the amplified current is supplied to the microcomputer 120, a first servo circuit 121, and a second servo circuit 122.

The first servo circuit 121 compares the value of the current supplied from the current amplifier 119 with a first current setting value sent from the microcomputer 120, and outputs a coarse movement control signal for performing coarse movement control of the distance between the probe electrode 114 and the recording layer 104, so that the two values become equal to each other, to a Z direction coarse movement control circuit 113. The Z direction coarse movement control circuit 113 generates a signal for driving a coarse movement mechanism 111 in the Z-axis direction in FIG. 8 on the basis of the coarse movement control signal, and outputs the generated signal to the coarse movement mechanism 111. Thus, the distance between the probe electrode 114 and the recording layer 104 is coarsely adjusted. The second servo circuit 122 compares the value of the current supplied from the current amplifier 119 with a second current setting value sent from the microcomputer 120, and outputs a fine movement control signal for performing fine movement control of the distance between the probe electrode 114 and the recording layer 104, so that the two values become equal to each other, to a Z direction fine movement control circuit 118. The Z direction fine movement control circuit 118 generates a signal for driving a Z direction fine movement mechanism 116 in the z-axis direction in FIG. 8 on the basis of the fine movement control signal, and outputs the generated signal to the Z direction fine movement mechanism 116. Thus, the distance between the probe electrode 114 and the recording layer 104 is finely adjusted, i.e., is maintained to a predetermined distance.

Figure 8:
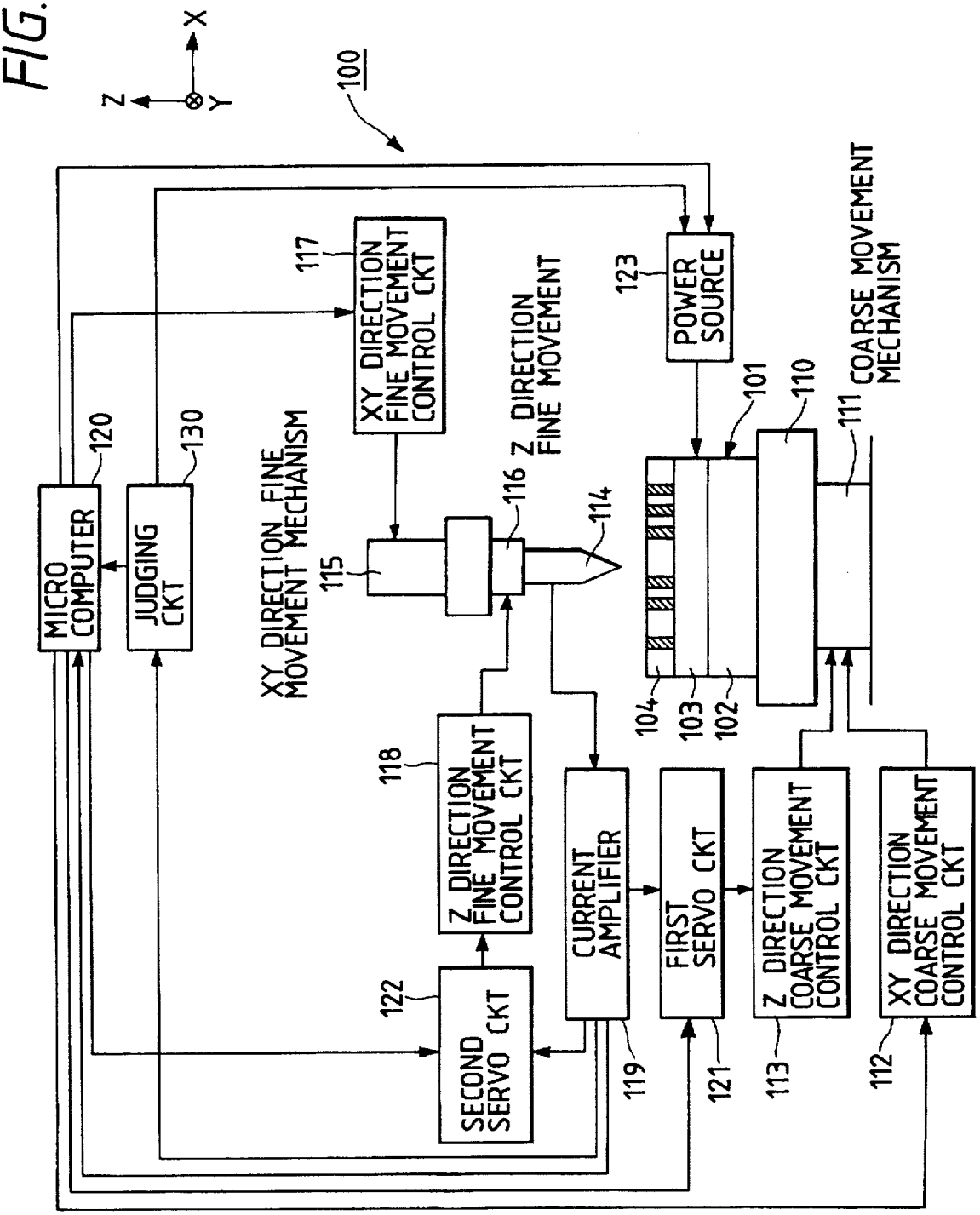
FIG. 8 is a schematic diagram showing the third embodiment of a recording/reproduction apparatus according to the present invention.

An XY direction coarse movement control circuit 112 generates a signal for driving the coarse movement mechanism 111 in the X- and Y-axis directions in FIG. 8 on the basis of an instruction from the microcomputer 120, and outputs the generated signal to the coarse movement mechanism 111. An XY direction fine movement control circuit 117 generates a signal for driving an XY direction fine movement mechanism 115 in the X- and Y-axis directions in FIG. 8 on the basis of an instruction from the microcomputer 120, and outputs the generated signal to the XY direction fine movement mechanism 115. Thus, the probe electrode 114 is scanned to the recording position of the recording medium 101.

The power source 123 generates a recording bias voltage and a recording pulse voltage on the basis of an instruction from the microcomputer 120. The recording bias voltage and the recording pulse voltage are applied to the recording layer 104 via a substrate electrode 103 of the recording medium 101. A recording bit is formed on the recording layer 104 since the conductivity of a portion, applied with the recording pulse voltage, of the recording layer 104 changes locally.

In a case wherein recording is performed by increasing the conductivity of the recording layer 104 by applying a recording voltage (recording bias voltage and recording pulse voltage) to the recording layer 104 having a small conductivity $\rho_L$ in an initial state, as has been described in the operation of the recording apparatus 10 shown in FIG. 4, when the conductivity $\rho$ of the recording layer 104 changes from a small conductivity $\rho_L$ to a large conductivity $\rho_H$ upon application of the recording voltage, the current amplifier 119 does not detect any discharge current after application of the recording voltage. However, when the conductivity $\rho$ does not change irrespective of application of the recording voltage, the current amplifier 119 detects a discharge current after application of the recording voltage. Therefore, the determining circuit 130 can determine whether or not information is accurately recorded by detecting whether or not the discharge current is supplied from the current amplifier 119 after application of the recording voltage. As a method of detecting the presence/absence of a discharge current in the determining circuit 130, the same method as the method of detecting the presence/absence of a discharge current in the determining circuit 13 shown in FIG. 4 can be used.

When no discharge current is detected from the current supplied from the current amplifier 119 after application of the recording voltage, the determining circuit 130 determines that information is accurately recorded, and supplies information indicating that information is accurately recorded, to the microcomputer 120. Upon reception of this information from the determining circuit 130, the microcomputer 120 starts the scanning operation of the probe electrode 114 to the next recording position. On the other hand, when a discharge current is detected from the current supplied from the current amplifier 119 after application of the recording voltage, the determining circuit 130 determines that information is not accurately recorded, and supplies information indicating that the recording voltage is to be applied again, to the microcomputer 120. Upon reception of this information from the determining circuit 130, the microcomputer 120 does not start the scanning operation of the probe electrode 114 to the next recording position. An instruction for applying the recording voltage (recording bias voltage and recording pulse voltage) again is supplied to the power source 123, and the recording voltage is applied from the power source 123 to the recording medium 101 again. In this manner, since application of the recording voltage is repeated until information is accurately recorded, the error rate upon formation of a recording bit can be greatly decreased, and information can be reliably recorded on the recording medium 101.

In a case wherein recording is performed by decreasing the conductivity of the recording layer 104 by applying a recording voltage (recording bias voltage and recording pulse voltage) to the recording layer 104 having a large conductivity $\rho_H$ in an initial state, as has been described in the operation of the recording apparatus 10 shown in FIG. 4, when the conductivity $\rho$ of the recording layer 104 changes from a large conductivity $\rho_H$ to a small conductivity $\rho_L$ upon application of the recording voltage, the current amplifier 119 detects a discharge current immediately after application of the recording voltage (at the time of application of the recording voltage). However, when the conductivity $\rho$ does not change irrespective of application of the recording voltage, the current amplifier 119 does not detect any discharge current at the time of application of the recording voltage. Therefore, in this case as well, the determining circuit 130 can determine whether or not information is accurately recorded by detecting whether or not a discharge current is included in the current supplied from the current amplifier 119. As the method of detecting the presence/absence of a discharge current in the determining circuit 130, the same method as the method of detecting the present/absence of a discharge current in the determining circuit 13 shown in FIG. 4 can be used.

When a discharge current is detected from the current supplied from the current amplifier 119 after application of the recording voltage, the determining circuit 130 determines that information is accurately recorded, and supplies information indicating that information is accurately recorded, to the microcomputer 120. Upon reception of this information from the determining circuit 130, the microcomputer 120 starts the scanning operation of the probe electrode 114 to the next recording position. On the other hand, when no discharge current is detected from the current supplied from the current amplifier 119 after application of the recording voltage, the determining circuit 130 determines that information is not accurately recorded, to the microcomputer 120. Upon reception of this information from the determining circuit 130, the microcomputer 120 does not start the scanning operation of the probe electrode 114 to the next recording position. An instruction for applying the recording voltage (recording bias voltage and recording pulse voltage) again is supplied to the power source 123, and the recording voltage is applied from the power source 123 to the recording medium 101 again. In this manner, since application of the recording voltage is repeated until information is accurately recorded, the error rate upon formation of a recording bit can be greatly decreased, and information can be reliably recorded on the recording medium 101.

As for the erasing operation in the recording/reproduction apparatus 100, information recorded on the recording medium 101 can be stably erased by performing the same operation as the above-mentioned recording operation.

In the reproduction mode, the probe electrode 114 is scanned to the reproduction position on the recording medium 101 in the same manner as the recording mode. Thereafter, the power source 123 generates a reproduction bias voltage. The reproduction bias voltage is applied to the recording layer 104 via the substrate electrode 102 of the recording medium 101. At this time, a current flowing between the recording layer 104 and the probe electrode 114 is amplified by the current amplifier 119, and the amplified current is supplied to the microcomputer 120. The microcomputer 120 calculates the conductivity of the recording layer 104 on the basis of the value of the supplied current. Since the presence/absence of a recording bit can be detected by the calculated value of the conductivity, recorded information can be reproduced.

The third embodiment of a recording apparatus according to the present invention will be described below.

Since the recording/reproduction apparatus 100 shown in FIG. 8 has the recording and reproduction functions, the power source 123 has a function of generating a reproduction bias voltage, and the microcomputer 120 has a function of reproducing information from the current supplied from the current amplifier 119. However, by omitting these functions from the power source 123 and the microcomputer 120, the recording apparatus having only a recording function according to the third embodiment of present invention can be realized.

[Fourth Embodiment]

Figure 9:
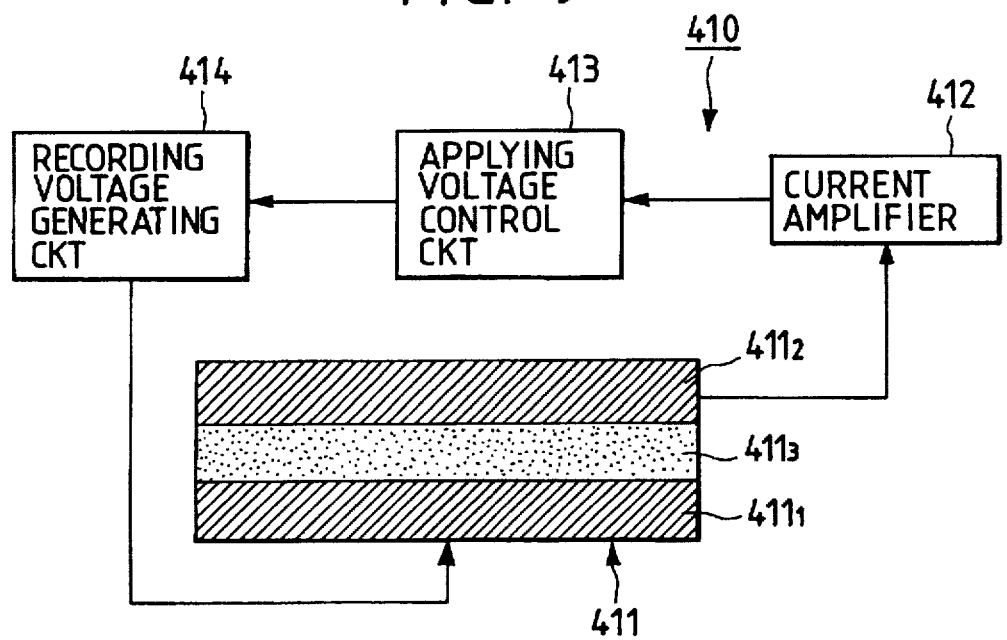
FIG. 9 is a schematic diagram showing the fourth embodiment of a recording apparatus according to the present invention.

FIG. 9 is a schematic diagram showing the fourth embodiment of a recording apparatus according to the present invention.

A recording apparatus 410 according to the fourth embodiment includes a recording medium 411, a current amplifier 412, an applying voltage control circuit 413, and a recording voltage generating circuit 414. The recording medium 411 includes a lower electrode $411_1$, an upper electrode $411_2$, and a recording layer $411_3$ consisting of an LB film which is formed between the upper and lower electrodes $411_2$ and $411_1$, and has different conductivities between a non-recording state and a recording state. More specifically, the recording medium 411 has the element structure of the above-mentioned MIM element. The recording voltage generating circuit 414 generates a recording voltage in accordance with an instruction supplied from the applying voltage control circuit 413, and applies the generated recording voltage across the lower and upper electrodes $411_1$ and $411_2$, thereby applying the recording voltage to the recording layer $411_3$. The current amplifier 412 detects and amplifies a current flowing between the lower and upper electrodes $411_1$ and $411_2$ during application of the recording voltage. The applying voltage control circuit 413 detects the amount of change in value of the current supplied from the current amplifier 412. When the applying voltage control circuit 413 detects the amount of change exceeding a predetermined amount of change, it supplies an instruction for stopping application of the recording voltage, to the recording voltage generating circuit 414.

The operation of the recording apparatus 410 will be described below. A case will be exemplified below wherein information is recorded by increasing the conductivity $\rho$ of the recording layer $411_3$ by applying a recording voltage to the recording layer $411_3$ with a small conductivity $\rho$ in a non-recording state.

Figure 10A:
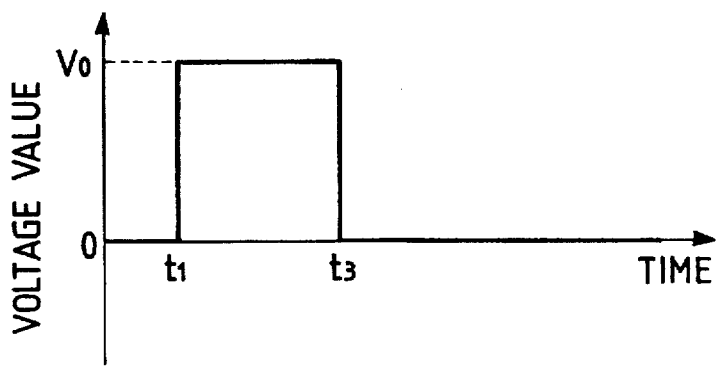
Figure 10B:
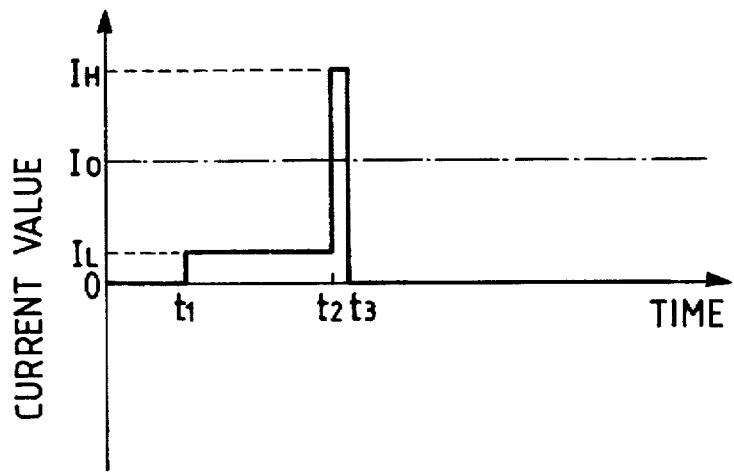

The applying voltage control circuit 413 outputs an instruction for outputting a recording voltage of a voltage value $V_0$ from time $t_1$ to the recording voltage generating circuit 414, as shown in FIG. 10A. Based on this instruction, the recording voltage generating circuit 414 applies the recording voltage of the voltage value $V_0$ across the upper and lower electrodes $411_1$ and $411_2$. At time $t_1$, since the conductivity $\rho$ of the recording layer $411_3$ is a small conductivity $\rho_L$, the current detected and amplified by the current amplifier 412 has a small current value $I_L$, as shown in FIG. 10B. Thereafter, the recording voltage of the voltage value $V_0$ is kept applied across the lower and upper electrodes $411_1$ and $411_2$. If the conductivity ρ of the recording layer $411_3$ changes to a large conductivity $\rho_H$ at time $t_2$, the value of the current detected by the current amplifier 412 changes from the small current value $I_L$ to a large current value $I_H$ at time $t_2$, as shown in FIG. 10B. Upon detection of the change in value of the current supplied from the current amplifier 412 from the small current value $I_L$ to the large current value $I_H$, the applying voltage control circuit 413 generates an instruction for stopping application of the recording voltage, and outputs the generated instruction to the recording voltage generating circuit 414. As a result, the voltage value of the recording voltage is set to "0" at time $t_3$, and a series of information recording operations end.

Note that the applying voltage control circuit 413 can easily detect the amount of change in value of the current supplied from the current amplifier 412 as follows. That is, since the small and large current values $I_L$ and $I_H$ are known, a reference current value $I_0$ as an intermediate current value between the small and large current values $I_L$ and $I_H$ is set, as shown in FIG. 10B, and the value of the current supplied from the current amplifier 412 is compared with the reference current value $I_0$. In FIG. 10A, a time difference ($t_3$–$t_2$) generated between time $t_2$ at which the value of the current supplied from the current amplifier 412 changes and time $t_3$ at which the value of the recording voltage is set to be "0" is determined by the delay time of the constituting circuit elements of the applying voltage control circuit 413, and it is preferable that the applying voltage control circuit 413 be arranged to shorten the delay time as much as possible.

Note that no discharge current caused by a capacitance appears in the current waveform shown in FIG. 10B in this embodiment unlike that shown in FIG. 6B or 6C.

Whether the current waveform to be detected is the one shown in FIG. 10B or the one shown in FIG. 6B or 6C is closely related to the conductivity and capacitance. This will be described in detail below.

Upon application of a voltage to the recording layer of the conductivity ρ, a capacitance C1 serving as a boundary for determining whether a discharge current shown in FIG. 6B or 6C is generated to have an amplitude which is large enough to be clearly observed, exists. If the capacitance is larger than C1, the current waveform shown in FIG. 6B or 6C is detected upon application of the voltage; if the capacitance is smaller than C1, the current waveform shown in FIG. 10B is detected.

As described above, this embodiment (the following embodiments as well) is achieved under the assumption of the latter case.

Figure 1:
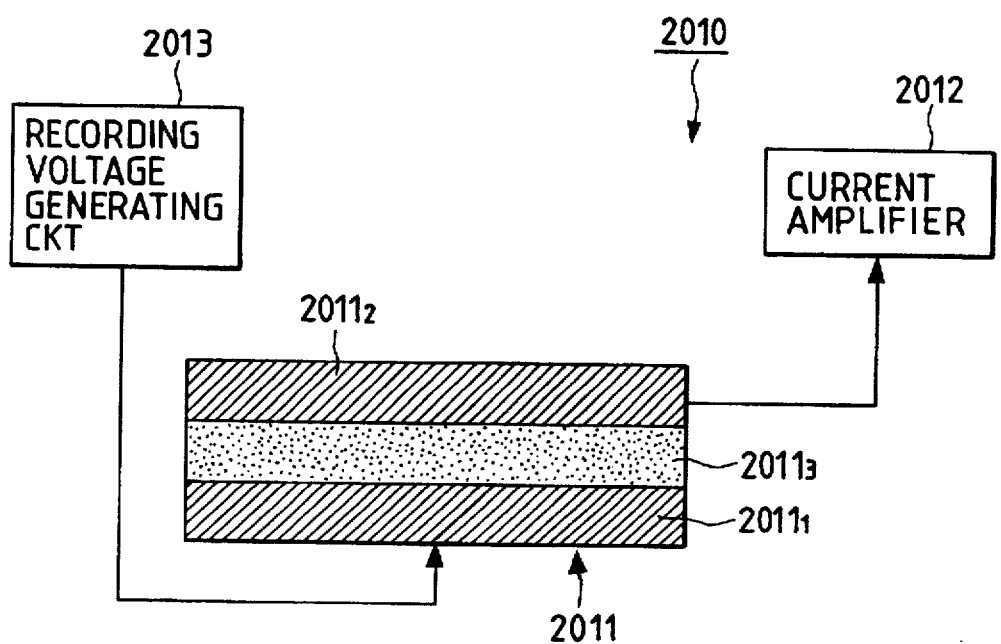
FIG. 1 is a schematic diagram showing a prior art of a recording apparatus using an MIM element.
Figure 2A:
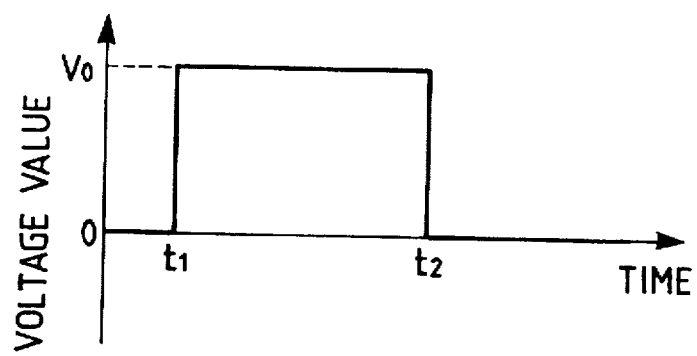
Figure 2B:
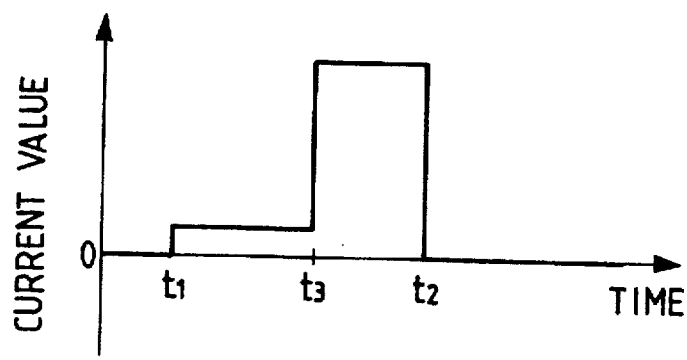
Figure 2C:
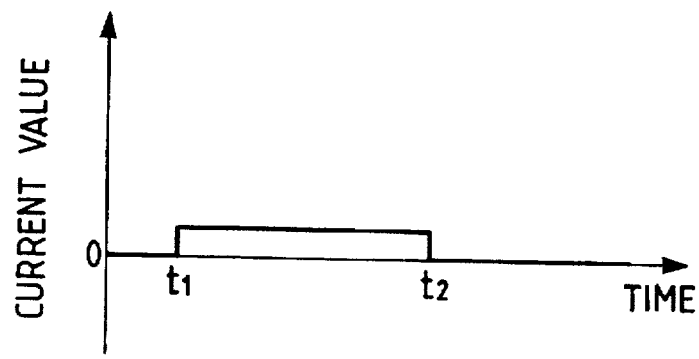

As described above, in the recording apparatus 410, since the recording voltage is applied until the conductivity ρ of the recording layer $411_3$ changes, information can be reliably recorded. Unlike the conventional recording apparatus 2010 shown in FIG. 1, the recording voltage application time including a margin need not be set to reliably record information, and application of the recording voltage can be stopped when the conductivity ρ of the recording layer $411_3$ changes, thus providing the following advantages.

1) The recording time can be shortened.

2) Since an excessive current is not supplied to elements constituting the recording layer $411_3$, the load on the elements can be reduced, and destruction of the elements can be prevented, thus assuring a long service life.

The fourth embodiment of a recording/reproduction apparatus according to the present invention will be described below.

The recording apparatus 410 shown in FIG. 9 has only a recording function. A recording/reproduction apparatus also having a reproduction function can be realized by adding, to the recording apparatus 410, a means for applying a reproduction voltage (reproduction bias voltage) across the lower and upper electrodes $411_1$ and $411_2$ of the recording medium 411 in a reproduction mode, and an information reproduction means for reproducing information from a current sent from the current amplifier 412.

[Fifth Embodiment]

The fifth embodiment of a recording apparatus according to the present invention will be described below with reference to FIGS. 11A and 11B.

A recording apparatus 550 according to the fifth embodiment of the present invention includes a recording medium 551, a recording voltage generating circuit 552, a lower electrode selecting circuit 553, an upper electrode selecting circuit 554, a current amplifier 555, an applying voltage control circuit 556, and a microcomputer 557. The constituting elements of the recording apparatus 550 will be described below.

(1) Recording Medium 551

The recording medium 551 includes a lower electrode group (lower electrodes $551_{11}$ to $551_{18}$ which are formed to be parallel to each other), an upper electrode group (upper electrodes $551_{21}$ to $551_{28}$ which are formed to be parallel to each other, and to be perpendicular to the lower electrode group), and a recording layer $551_3$ consisting of an LB film which is formed between the upper and lower electrode groups, and whose conductivity locally changes upon application of a voltage.

(2) Recording Voltage Generating Circuit 552, Lower Electrode Selecting Circuit 553, and Upper Electrode Selecting Circuit 554

The recording voltage generating circuit 552 generates a recording voltage in accordance with an instruction supplied from the microcomputer 557, and stops application of the recording voltage in accordance with an instruction supplied from the applying voltage control circuit 556. The lower electrode selecting circuit 553 selects one of the lower electrode groups (lower electrodes $551_{11}$ to $551_{18}$), and connects the selected electrode to the recording voltage generating circuit 552. The upper electrode selecting circuit 554 selects one of the upper electrode groups (upper electrodes $551_{21}$ to $551_{28}$), and connects the selected electrode to the current amplifier 555.

(3) Current Amplifier 555

The current amplifier 555 detects and amplifies a current flowing between the lower electrode selected by the lower electrode selecting circuit 553 and the upper electrode selected by the upper electrode selecting circuit 554 during application of a recording voltage.

(4) Applying Voltage Control Circuit 556

The applying voltage control circuit 556 detects the amount of change in value of the current supplied from the current amplifier 555. Upon detection of an amount of change exceeding a predetermined amount of change, the applying voltage control circuit 556 supplies an instruction for stopping application of the recording voltage to the recording voltage generating circuit 552.

(5) Microcomputer 557

The microcomputer 557 controls the recording voltage generating circuit 552, the lower electrode selecting circuit 553, and the upper electrode selecting circuit 554.

The operation of the recording apparatus 550 will be described below. A case will be exemplified below wherein information is recorded by increasing the conductivity ρ of the recording layer $551_3$ by applying a recording voltage to the recording layer $551_3$ with a small conductivity ρ in a non-recording state.

When the microcomputer 557 outputs an instruction for generating a recording voltage to the recording voltage generating circuit 552, the recording voltage generating circuit 552 generates a recording voltage. The microcomputer 557 outputs an instruction for selecting a lower electrode to which the recording voltage is to be applied (e.g., the lower electrode $551_{11}$ at the left end in FIG. 11A) to the lower electrode selecting circuit 553, and also outputs an instruction for selecting an upper electrode corresponding to an information recording position (e.g., the upper electrode $551_{21}$ at the upper end in FIG. 11A) to the upper electrode selecting circuit 554. Thus, the recording voltage is applied between the lower electrode $551_{11}$ selected by the lower electrode selecting circuit 553 and the upper electrode $551_{21}$ selected by the upper electrode selecting circuit 554, thus recording information on the recording layer $551_3$.

A current flowing between the lower electrode $551_{11}$ selected by the lower electrode selecting circuit 553 and the upper electrode $551_{21}$ selected by the upper electrode selecting circuit 554 is detected and amplified by the current amplifier 555, and the amplified current is supplied to the supplying voltage control circuit 556. The applying voltage control circuit 556 detects the amount of change in value of the current supplied from the current amplifier 555 by the same method as in the applying voltage control circuit 413 as shown in FIG. 9. Upon detection of an amount of change exceeding a predetermined amount of change, the applying voltage control circuit 556 supplies an instruction for stopping application of the recording voltage to the recording voltage generating circuit 552, and supplies information indicating that information is accurately recorded, to the microcomputer 557. Upon reception of the instruction for stopping application of the recording voltage from the applying voltage control circuit 556, the recording voltage generating circuit 552 stops generation of the recording voltage. Upon reception of the above-mentioned information from the applying voltage control circuit 556, the microcomputer 557 outputs an instruction for selecting a lower electrode to which the recording voltage is to be applied (e.g., the second lower electrode $551_{12}$ from the left end in FIG. 11A) to the lower electrode selecting circuit 553, and outputs an instruction for selecting an upper electrode corresponding to the information recording position (e.g., the upper electrode $551_{21}$ at the upper end in FIG. 11A) to the upper electrode selecting circuit 554, so as to select the next recording position.

Upon repetition of the above-mentioned operation, information is two-dimensionally recorded on the recording medium 551. Therefore, in the recording apparatus 550, since the recording voltage is applied until the conductivity ρ of the recording layer $551_3$ changes, information can be reliably recorded, thus obtaining the same effects as in the recording apparatus 410 shown in FIG. 9. As for the erasing operation in the recording apparatus 550, information recorded on the recording medium 551 can be stably erased by performing the same operation as the above-mentioned recording operation.

The fifth embodiment of a recording/reproduction apparatus according to the present invention will be described below.

Figure 11A:
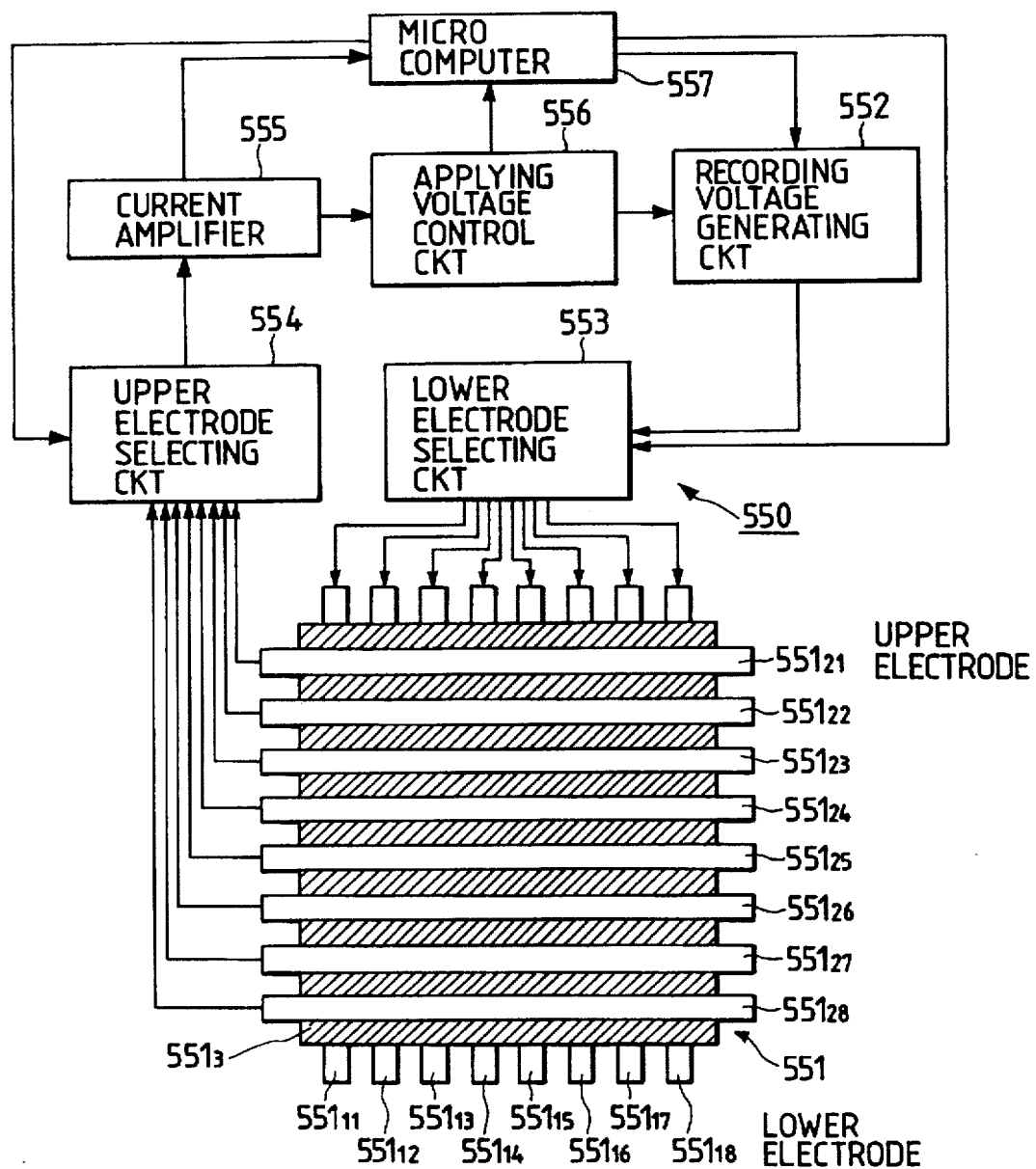
Figure 11B:
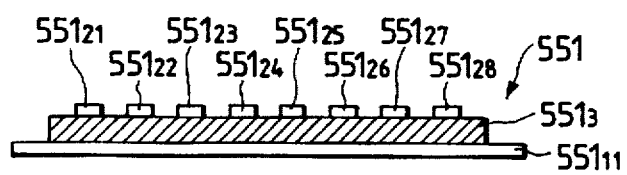

The recording apparatus 550 shown in FIGS. 11A and 11B has only a recording function. However, by adding the following functions to the recording voltage generating circuit 552 and the microcomputer 557, a recording/reproduction apparatus also having a reproduction function can be realized.

(1) A function for generating a reproduction voltage (reproduction bias voltage) in a reproduction mode is added to the recording voltage generating circuit 552.

(2) A function for outputting an instruction for selecting a lower electrode, to which a reproduction voltage is to be applied, to the lower electrode selecting circuit 553, and outputting an instruction for selecting an upper electrode corresponding to an information reproduction position to the upper electrode selecting circuit 554 in the reproduction mode, and a function for reproducing information based on a current sent from the current amplifier 555 in the reproduction mode are added to the microcomputer 557.

In place of adding the function for generating a reproduction voltage in the reproduction mode to the recording voltage generating circuit 552 described in (1) above, means for generating a reproduction voltage in the reproduction mode may be separately arranged.

[Sixth Embodiment]

The sixth embodiment of a recording/reproduction apparatus according to the present invention will be described below with reference to FIG. 12.

A difference between a recording/reproduction apparatus 600 according to the sixth embodiment of the present invention and the conventional recording/reproduction apparatus 3000 shown in FIG. 3 is that the apparatus 600 comprises an applying voltage control circuit 630 for detecting the amount of change in value of a current supplied from a current amplifier 619, and for, when an amount of change exceeding a predetermined amount of change is detected, supplying an instruction for stopping application of a recording voltage to a power source 623.

The recording and reproduction operations of the recording/reproduction apparatus 600 will be described below. A case will be exemplified below wherein information is recorded by increasing the conductivity ρ of a recording layer 604 by applying a recording voltage to the recording layer 604 with a small conductivity ρ in a non-recording state.

In the recording mode, the power source 623 applies a predetermined bias voltage to a substrate electrode 603 of a recording medium 601 under the control of a microcomputer 620. Thus, the predetermined bias voltage is applied between a probe electrode 614 and the recording layer 604 of the recording medium 601. A current flowing between the probe electrode 614 and the recording layer 604 at that time is detected and amplified by the current amplifier 619, and the amplified current is supplied to the microcomputer 620, a first servo circuit 621, and a second servo circuit 622.

The first service circuit 621 compares the value of the current supplied from the current amplifier 619 with a first current setting value sent from the microcomputer 620, and outputs a coarse movement control signal for performing coarse movement control of the distance between the probe electrode 614 and the recording layer 604, so that the two values become equal to each other, to a Z direction coarse movement control circuit 613. The Z direction coarse movement control circuit 613 generates a signal for driving a coarse movement mechanism 611 in the Z-axis direction in FIG. 12 on the basis of the coarse movement control signal, and outputs the generated signal to the coarse movement mechanism 611. Thus, the distance between the probe electrode 614 and the recording layer 604 is coarsely adjusted. The second servo circuit 622 compares the value of the current supplied from the current amplifier 619 with a second current setting value sent from the microcomputer

620, and outputs a fine movement control signal for performing fine movement control of the distance between the probe electrode 614 and the recording layer 604, so that the two values become equal to each other, to a Z direction fine movement control circuit 618. The Z direction fine movement control circuit 618 generates a signal for driving a Z direction fine movement mechanism 616 in the Z-axis direction in FIG. 12 on the basis of the fine movement control signal, and outputs the generated signal to the Z direction fine movement mechanism 616. Thus, the distance between the probe electrode 614 and the recording layer 604 is finely adjust, i.e., is maintained to a predetermined distance.

An XY direction coarse movement control circuit 612 generates a signal for driving the coarse movement mechanism 611 in the X- and Y-axis directions in FIG. 12 on the basis of an instruction from the microcomputer 620, and outputs the generated signal to the coarse movement mechanism 611. An XY direction fine movement control 617 generates a signal for driving an XY direction fine movement mechanism 615 in the X- and Y-axis directions in FIG. 12 on the basis of an instructions from the microcomputer 620, and outputs the generated signal to the XY direction fine movement mechanism 615. Thus, the probe electrode 614 is scanned to the recording position of the recording medium 601.

The power source 623 generates a recording voltage on the basis of an instruction from the microcomputer 620. The recording voltage is applied to the recording layer 604 via the substrate electrode 602 of the recording medium 601. A recording bit is formed on the recording layer 604 since the conductivity of a portion, applied with the recording pulse voltage, of the recording layer 604 changes locally.

In a case wherein recording is performed by increasing the conductivity of the recording layer 604 by applying a recording voltage to the recording layer 604 having a small conductivity $\rho_L$ in a non-recording state, as has been described in the operation of the recording apparatus 410 shown in FIG. 8, when the conductivity $\rho$ of the recording layer 604 changes from a small conductivity $\rho_L$ to a large conductivity $\rho_H$ upon application of the recording voltage, the value of the current detected by the current amplifier 619 changes from a small value to a large value during application of the recording voltage. Therefore, the applying voltage control circuit 630 detects the amount of change in a value of the current supplied from the current amplifier 619 during application of the recording voltage. Upon detection of an amount of change exceeding a predetermined amount of change, the applying voltage control circuit 630 supplies an instruction for stopping application of the recording voltage to the power source 623, and also applies information indicating that information is accurately recorded to the microcomputer 620. Upon reception of this information, the microcomputer 620 starts the scanning operation of the probe electrode 614 to the next recording position.

As described above, in the recording/reproduction apparatus 600, since the recording voltage is applied until the conductivity $\rho$ of the recording layer 604 changes, information can be reliably recorded, thus obtaining the same effects as in the recording apparatus 410 shown in FIG. 9. As for the erasing operation in the recording/reproduction apparatus 600, information recorded on the recording medium 601 can be stably erased by performing the same operation as the above-mentioned recording operation.

In the reproduction mode, the probe electrode 614 is scanned to the reproduction position on the recording medium 601 in the same manner as in the recording mode.

Thereafter, the power source 623 generates a reproduction voltage. The reproduction voltage is applied to the recording layer 604 via a substrate electrode 602 of the recording medium 601. At this time, a current flowing between the recording layer 604 and the probe 614 is amplified by the current amplifier 619, and the amplified current is supplied to the microcomputer 620. The microcomputer 620 calculates the conductivity of the recording layer 604 on the basis of the value of the supplied current. Since the presence/absence of a recording bit can be detected by the calculated value of the conductivity, recorded information can be reproduced.

The sixth embodiment of a recording apparatus according to the present invention will be described below.

Since the recording/reproduction apparatus 600 shown in FIG. 12 has the recording and reproduction functions, the power source 623 has a function of generating a reproduction bias voltage, and the microcomputer 620 has a function of reproducing information from the current supplied from the current amplifier 619. However, by omitting these functions from the power source 623 and the microcomputer 620, a recording apparatus having only a recording function can be realized.

[Seventh Embodiment]

Figure 13A:
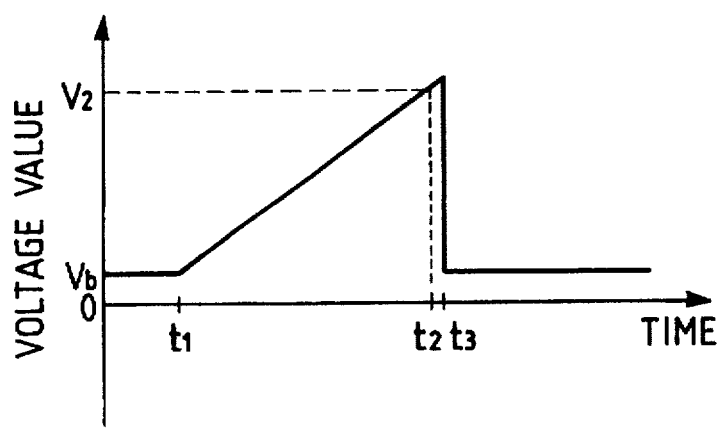
Figure 13B:
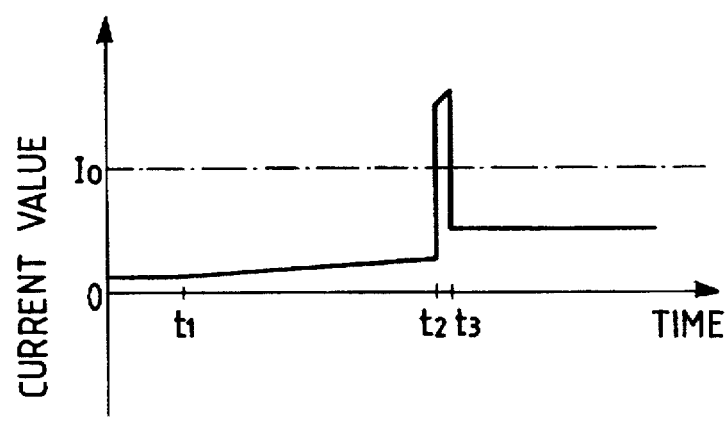

FIGS. 13A and 13B are graphs for explaining the operation of the seventh embodiment of a recording/reproduction apparatus according to the present invention.

A difference between the recording/reproduction apparatus of this embodiment and the recording/reproduction apparatus shown in FIG. 12 is that the power source 123 in the sixth embodiment generates, as a recording voltage, a ramp-wave voltage whose value monotonically increases as time elapses, as shown in FIG. 13A.

The recording operation of the recording/reproduction apparatus of this embodiment will be described below. A case will be discussed below wherein recording is performed by increasing the conductivity $\rho$ of the recording layer 604 by applying a recording voltage to the recording layer 604 having a small conductivity $\rho$ in a non-recording state. Note that the recording/reproduction apparatus of this embodiment has the same arrangement as that of the recording/reproduction apparatus 600 shown in FIG. 12, and the constituting elements shown in FIG. 12 will be quoted in the following description.

In the recording mode, the power source 623 applies a bias voltage of a voltage value $V_b$ (see FIG. 13A) to the substrate electrode 603 of the recording medium 601 under the control of the microcomputer 620. Thus, the bias voltage of the voltage Value $V_b$ is applied between the probe electrode 614 and the recording layer 604 of the recording medium 601. A current flowing between the probe electrode 614 and the recording layer 604 at that time is detected and amplified by the current amplifier 619, and the amplified current is supplied to the microcomputer 620, the first servo circuit 621, and the second servo circuit 622.

The first servo circuit 621 compares the value of the current supplied from the current amplifier 619 with a first current setting value sent from the microcomputer 620, and outputs a coarse movement control signal for performing coarse movement control of the distance between the probe electrode 614 and the recording 604, so that the two values become equal to each other, to the Z direction coarse movement control circuit 613. The Z direction coarse movement control circuit 613 generates a signal for driving the coarse movement mechanism 611 in the Z-axis direction in FIG. 12 on the basis of the coarse movement control signal, and outputs the generated signal to the coarse movement mechanism 611. Thus, the distance between the probe electrode 614 and the recording layer 604 is coarsely adjusted. The second servo circuit 622 compares the value of the current supplied from the current amplifier 619 with a second current setting value sent from the microcomputer 620, and outputs a fine movement control signal for performing fine movement control of the distance between the probe electrode 614 and the recording layer 604, so that the two values become equal to each other, to the Z direction fine movement control circuit 618. The Z direction fine movement control circuit 618 generates a signal for driving the Z direction fine movement mechanism 616 in the Z-axis direction in FIG. 12 on the basis of the fine movement control signal, and outputs the generated signal to the Z direction fine movement mechanism 616. Thus, the distance between the probe electrode 614 and the recording layer 604 is finely adjusted, i.e., is maintained to a predetermined distance.

The XY direction coarse movement control circuit 612 generates a signal for driving the coarse movement mechanism 611 in the X- and Y-axis directions in FIG. 12 on the basis of an instruction from the microcomputer 620, and outputs the generated signal to the coarse movement mechanism 611. The XY direction fine movement control circuit 617 generates a signal for driving the XY direction fine movement mechanism 615 in the X- and Y-axis directions in FIG. 12 on the basis of an instruction from the microcomputer 620, and outputs the generated signal to the XY direction fine movement mechanism 615. Thus, the probe electrode 614 is scanned to the recording position of the recording medium 601.

The power source 623 generates a ramp-wave recording voltage from time $t_1$ on the basis of an instruction from the microcomputer 620. The recording voltage is applied to the recording layer 604 via the substrate electrode 602 of the recording medium 601. The voltage value of the recording voltage increases as time elapses, and when the conductivity of a portion, applied with the recording voltage, of the recording layer 604 changes locally at time $t_2$, a recording bit is formed on the recording layer 604.

In a case wherein recording is performed by increasing the conductivity of the recording layer 604 by applying a recording voltage to the recording layer 604 having a small conductivity $\rho_L$ in a non-recording state, as has been described in the operation of the recording apparatus 410 shown in FIG. 8, when the conductivity $\rho$ of the recording layer 604 changes from a small conductivity $\rho_L$ to a large conductivity $\rho_H$ upon application of the recording voltage, the value of the current detected by the current amplifier 619 changes from a small value to a large value during application of the recording voltage, as shown in FIG. 13B. Therefore, the applying voltage control circuit 630 detects the amount of change in value of the current supplied from the current amplifier 619 during application of the recording voltage. Upon detection of an amount of change exceeding a predetermined amount of change (a current having a value exceeding a reference current value $I_0$ in FIG. 13B (time $t_3$)), the applying voltage control circuit 630 supplies an instruction for stopping application of the recording voltage to the power source 623, and also supplies information indicating that information is accurately recorded to the microcomputer 620. The power source 623 receives the instruction to return the voltage to the value $V_b$. Upon reception of this information from the applying voltage control circuit 630, the microcomputer 620 starts the scanning operation of the probe electrode 614 to the next recording position.

As described above, in the recording/reproduction apparatus of this embodiment, since the recording voltage is applied until the conductivity $\rho$ of the recording medium 601 changes, information can be reliably recorded, thus obtaining the same effects as in the recording apparatus 410 shown in FIG. 9. As for the erasing operation in the recording/reproduction apparatus of this embodiment, information recorded on the recording medium 601 can be stably erased by performing the same operation as the above-mentioned recording operation.

Modifications of this embodiment will be described below.

(1) In the recording/reproduction apparatus of this embodiment, when the applying voltage control circuit 630 detects that the value of the current supplied from the current amplifier 619 exceeds the reference current value $I_0$, the recording voltage output from the power source 623 is abruptly cut off, as shown in FIG. 13A. Alternatively, application of the recording voltage may be stopped to have a time constant which allows the voltage value to decrease monotonically. In this case, after the voltage value of the recording voltage becomes smaller than a predetermined value, the scanning operation of the probe electrode 614 to the next recording position is started.

(2) The applying voltage control circuit 630 may calculate a time differential value of the value of the current supplied from the current amplifier 619. When the calculated time differential value exceeds a predetermined value, the applying voltage control circuit 630 determines that the conductivity of the recording layer 604 has changed.

(3) The recording/reproduction apparatus may further comprise an auxiliary storage device for temporarily storing information to be recorded, which information is input from an external device. In the recording/reproduction apparatus of this embodiment, since the scanning operation of the probe electrode 614 to the next recording position is started after the change in conductivity of the recording layer 604 is confirmed, the recording time per bit of information does not always become constant. Therefore, when information consisting of a large number of bits is to be recorded, externally input information is temporarily stored in the auxiliary storage device, and is read out bit by bit from the auxiliary storage device, thus allowing stable information recording. Also, damage to elements constituting the recording layer 604 can be prevented, and the recording time can be prevented from being wasted, thus increasing the recording speed.

The seventh embodiment of a recording apparatus according to the present invention will be described below.

The above-mentioned recording/reproduction apparatus according to the seventh embodiment of the present invention has both the recording and reproduction functions. By omitting the reproduction function, a recording apparatus according to the seventh embodiment of the present invention can be realized.

[Eighth Embodiment]

Each of the above-mentioned recording apparatuses of the present invention adopts a recording method wherein information is recorded on a recording layer by setting the recording layer in a recording state by applying the recording voltage to the recording layer which has different current response characteristics for a voltage in a non-recording state and a recording state, and the apparatus is characterized in that the amount of change in value of a current flowing through the recording layer is detected during application of a recording voltage to the recording layer, the value of the detected amount of change in value of the current is compared with a predetermined amount of change, and when the detected amount of change in value of the current becomes larger than the predetermined amount of change, application of the recording voltage to the recording layer is stopped. In contrast to this, a recording apparatus of the present invention to be described below adopts a recording method wherein information is recorded on a recording layer by setting the recording layer in a recording state by injecting a recording current into the recording layer which has different voltage response characteristics for a current in a non-recording state and a recording state, and the apparatus is characterized in that the amount of change in value of a voltage generated in a recording layer is detected during injection of a recording current into the recording layer, the value of the detected amount of change in value of the voltage is compared with a predetermined amount of change, and when the detected amount of change in value of the voltage becomes larger than the predetermined amount of change, injection of the recording current into the recording layer is stopped.

Figure 14:
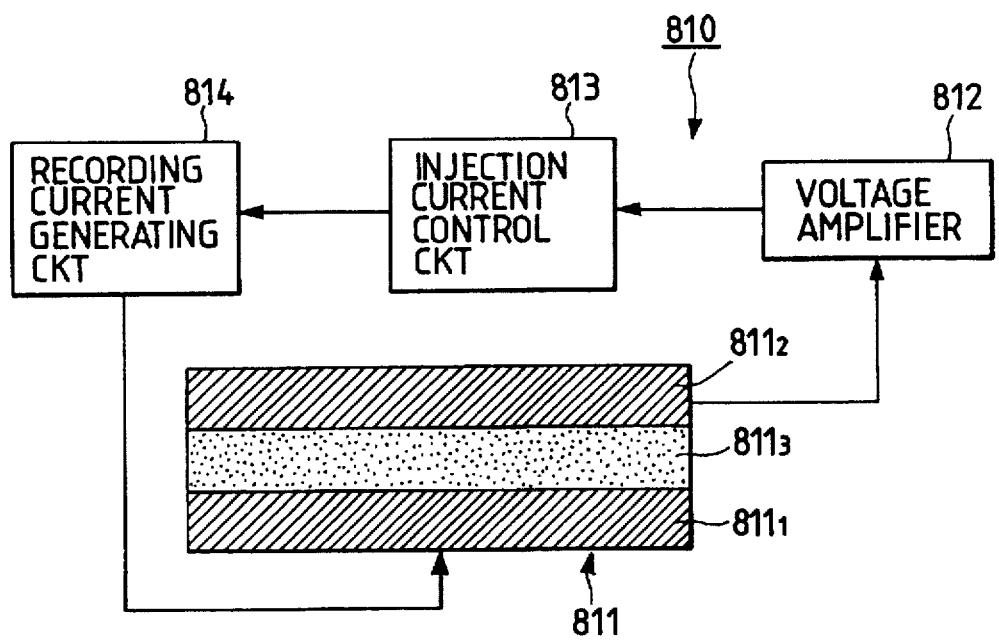
FIG. 14 is a schematic diagram showing the eighth embodiment of a recording apparatus according to the present invention.

FIG. 14 is a schematic diagram showing the eighth embodiment of a recording apparatus according to the present invention.

Differences between a recording apparatus 810 and the recording apparatus 410 shown in FIG. 9 are as follows:

(1) A recording medium 811 has a recording layer $811_3$ whose conductivity changes in a non-recording state and a recording state upon injection of a current.

(2) The recording apparatus 810 comprises a recording current generating circuit 814 in place of the recording voltage generating circuit 414 shown in FIG. 9. Note that a recording current generated by the recording current generating circuit 814 is injected into the recording layer $811_3$ via a lower electrode $811_1$ and an upper electrode $881_2$.

(3) The recording apparatus 810 comprises a voltage amplifier 812 for detecting and amplifying a voltage generated in the recording layer $811_3$ during injection of the recording current in place of the current amplifier 412 shown in FIG. 9.

(4) The recording apparatus 810 comprises an injection current control circuit 813 for comparing the amount of change in value of the voltage sent from the voltage amplifier 812 with a predetermined amount of change, and for, when the amount of change in value of the voltage becomes larger than a predetermined amount of change, supplying an instruction for stopping injection of the recording current into the recording layer $811_3$ to the recording current generating circuit 814, in place of the applying voltage control circuit 413 shown in FIG. 9.

The operation of the recording apparatus 810 will be described below. A case will be exemplified below wherein information is recorded by increasing the conductivity $\rho$ of the recording layer $811_3$ by injecting a recording current into the recording layer $811_3$ with a small conductivity $\rho$ in a non-recording state.

Figure 15A:
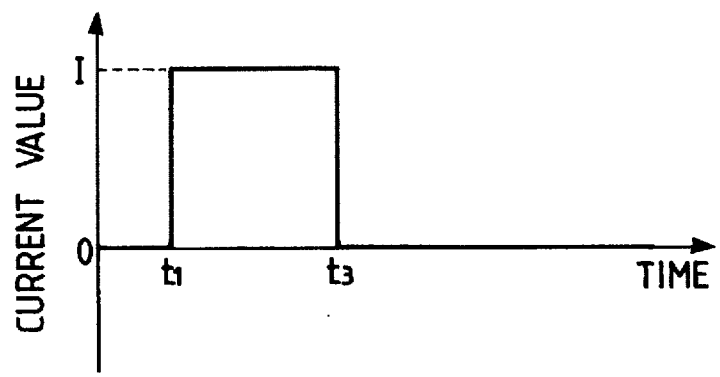
Figure 15B:
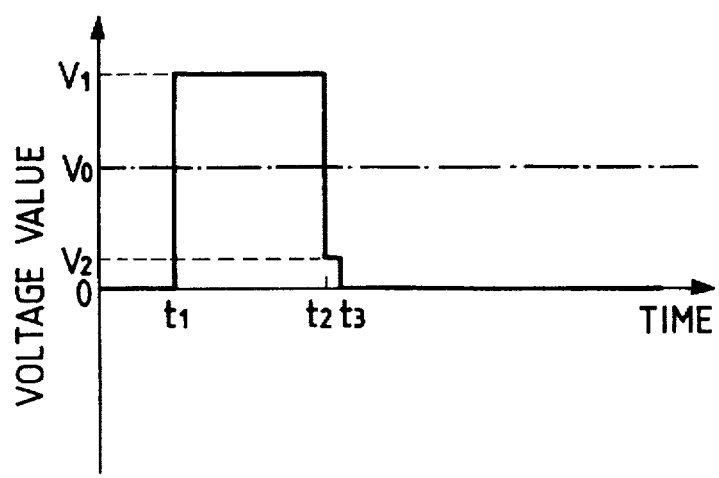

The injection current control circuit 813 outputs an instruction for injecting a recording current of a current value I from time $t_1$ shown in FIG. 15A to the recording current generating circuit 814. Based on this instruction, the recording current of the current value I is injected from the recording current generating circuit 814 into the recording layer $811_3$ via the lower and upper electrodes $811_1$ and $811_2$. At time $t_1$, since the conductivity $\rho$ of the recording medium 811 is a small conductivity $\rho_L$, the voltage detected and amplified by the voltage amplifier 812 has a large voltage value $V_1$, as shown in FIG. 15B. Thereafter, when the recording current of the current value I is kept injected into the recording layer $811_3$, and the conductivity $\rho$ of the recording medium 811 changes to a large conductivity $\rho_H$ at the time $t_2$, the value of the voltage detected and amplified by the voltage amplifier 812 changes from the large voltage value $V_1$ to a small voltage value $V_2$ at time $t_2$, as shown in FIG. 15B. When the injection current control circuit 813 detects that the amount of change in value of the voltage sent from the voltage amplifier 812 becomes larger than a predetermined amount of change, it generates an instruction for stopping injection of the recording current, and outputs the instruction to the recording current generating circuit 814. As a result, the current value of the recording current is set to be "0" at time $t_3$, as shown in FIG. 15A, and a series of information recording operations end.

Note that the injection current control circuit 813 can easily detect the amount of change in value of the voltage sent from the voltage amplifier 812 as follows. That is, since the large voltage value $V_1$ and the small voltage value $V_2$ are known, a reference voltage value $V_0$ (FIG. 15B) as an intermediate voltage value between the large and small voltage values $V_1$ and $V_2$ is set, and is compared with the value of the voltage sent from the voltage amplifier 812. In FIG. 15A, a time difference ($t_3-t_2$) generated between time $t_2$ at which the value of the voltage supplied from the voltage amplifier 812 changes and time $t_3$ at which the value of the recording current is set to be "0" is determined by the delay time of the constituting circuit elements of the injection current control circuit 813, and it is preferable that the injection current control circuit 813 be arranged to shorten the delay time as much as possible.

As described above, in the recording apparatus 810, since the recording current is injected until the conductivity $\rho$ of the recording layer $811_3$ changes, information can be reliably recorded. Unlike a conventional recording apparatus of this type, the recording current injection time including a margin need not be set to reliably record information, and injection of the recording current can be stopped when the conductivity $\rho$ of the recording layer $811_3$ changes, thus providing the following advantages.

(1) The recording time can be shortened.

(2) Since an excessive current is not supplied to elements constituting the recording layer $811_3$, the load on the elements can be reduced, and destruction of the elements can be prevented, thus assuring a long service life.

The eighth embodiment of a recording/reproduction apparatus according to the present invention will be described below.

The recording apparatus 810 shown in FIG. 14 has only a recording function. A recording/reproduction apparatus also having a reproduction function can be realized by adding, to the recording apparatus 810, a means for injecting a reproduction current into the recording layer $811_3$ of the recording medium 811 via the lower and upper electrodes $811_1$ and $811_2$ in a reproduction mode, and an information reproduction means for reproducing information from a voltage sent from the voltage amplifier 812.

[Ninth Embodiment]

The ninth embodiment of a recording apparatus according to the present invention will be described below.

Differences between the recording apparatus of this embodiment and the recording apparatus 550 shown in FIG. 11A are as follows:

(1) a recording medium has a recording layer whose conductivity changes between a non-recording state and a recording state upon injection of a current.

(2) The recording apparatus of this embodiment has a recording current generating circuit for generating a recording current in place of the recording voltage generating circuit 552 shown in FIG. 11A. A recording current generated by the recording current generating circuit is injected into the recording layer via a lower electrode selected by a lower electrode selecting circuit and an upper electrode selected by an upper electrode selecting circuit.

(3) The recording apparatus of this embodiment has a voltage amplifier for detecting and amplifying a voltage generated in the recording layer during injection of the recording current in place of the current amplifier 555 shown in FIG. 11A.

(4) The recording apparatus of this embodiment has an injection current control circuit for comparing the amount of change in value of the voltage sent from the voltage amplifier with a predetermined amount of change, and for, when the amount of change in value of the voltage sent from the voltage becomes larger than the predetermined amount of change, supplying an instruction for stopping injection of the recording current into the recording layer to the recording current generating circuit, in place of the applying voltage control circuit 556 shown in FIG. 11A.

Since the recording apparatus of this embodiment has the above-mentioned arrangement, the same effects as in the recording apparatus 550 shown in FIG. 11A can be provided.

The ninth embodiment of a recording/reproduction apparatus according to the present invention will be described below.

The above-mentioned recording apparatus according to the ninth embodiment of the present invention has only a recording function. A recording/reproduction apparatus also having a reproduction function can be realized by adding, to the recording apparatus, a means for injecting a reproduction current into the recording layer of the recording medium via the lower and upper electrodes in a reproduction mode, and an information reproduction means for reproducing information from a voltage sent from the voltage amplifier.

The recording/reproduction apparatus may have a reproduction function by adding a voltage applying means for applying a reproduction voltage to the recording layer of the recording medium via the lower and upper electrodes, and a current amplifier for detecting a current flowing through the recording medium.

[Tenth Embodiment]

The tenth embodiment of a recording/reproduction apparatus of the present invention will be described below.

Differences between the recording/reproduction apparatus of this embodiment and the recording/reproduction apparatus 600 shown in FIG. 12 are as follows:

(1) A recording medium has a recording layer whose conductivity changes between a non-recording state and a recording state upon injection of a current.

(2) The recording/reproduction apparatus of this embodiment has a current source for generating a recording current and a reproduction current in place of the power source 623 shown in FIG. 12. A recording current generated by the current source is injected into the recording layer via a probe electrode.

(3) The recording/reproduction apparatus of this embodiment has a voltage amplifier for detecting and amplifying a voltage generated between the probe electrode and the substrate electrode during injection of the recording current, in place of the current amplifier 619 shown in FIG. 12.

(4) In place of the applying voltage control circuit 630 shown in FIG. 12, the recording/reproduction apparatus of this embodiment has an injection current control circuit for comparing the amount of change in value of the voltage sent from the voltage amplifier with a predetermined amount of change, and for, when the amount of change in value of the voltage sent from the voltage becomes larger than the predetermined amount of change, supplying an instruction for stopping injection of the recording current into the recording layer to the current source.

Since the recording/reproduction apparatus of this embodiment has the above-mentioned arrangement, the same effects as in the recording/reproduction apparatus 600 shown in FIG. 12 can be provided.

The tenth embodiment of the present invention will be described below.

The above-mentioned recording/reproduction apparatus according to the tenth embodiment of the present invention has both the recording and reproduction functions. By omitting the reproduction function, a recording apparatus according to the tenth embodiment of the present invention can be realized.

In the explanation of the fourth to tenth embodiments, a recording medium having a recording layer whose conductivity changes upon application of a recording voltage or upon injection of a recording current is used as the recording layer. The same effects as described above may be provided when recording media having the following recording layers are used:

(1) A recording layer which has different current response characteristics to a voltage in a non-recording state and a recording state, and in which the value of a current flowing through an interface changes upon application of a recording voltage; and (2) a recording layer which has different voltage response characteristics for a current in a non-recording state and a recording state, and in which the value of a generated voltage changes upon injection of a recording current.

Upon detection of a change in conductivity of the recording layer, application of the recording voltage or injection of the recording current is stopped. Alternatively, the following methods may be used:

(1) When the current or voltage value does not change within a predetermined period of time, the value of the recording voltage to be applied or the recording current to be injected is increased.

(2) The value of the recording voltage or the recording current is changed in accordance with the amount of change in value of the current or the voltage during application of the recording voltage or during injection of the recording current.

(3) The value of the recording voltage is temporarily changed to a detection voltage value, and the value of the recording voltage is changed based on a current value detected at that time. For example, a DC voltage is applied as the recording voltage, the recording voltage is switched to an AC voltage after an elapse of a predetermined period of time, and a recording DC voltage value is changed in accordance with the value of an impedance detected at that time.

It should be noted that the above explanation can be similarly applied to eleventh embodiment.

[Eleventh Embodiment]

FIG. 16 is a schematic diagram showing the eleventh embodiment of a recording/reproduction apparatus according to the present invention.

A recording/reproduction apparatus 1100 realizes high-density recording on the order of atoms or molecules by using the principle of a scanning tunneling microscope, and using, as a recording layer, a thin film layer consisting of a material having a memory effect with respect to the switching characteristics of a voltage current (e.g., $\pi$-electron-based organic compound, a chalcogenide, or the like).

The recording/reproduction apparatus 1100 includes a recording medium 1101, a recording medium stage 1105, a probe electrode 1106, a recording medium driving mechanism 1107, a power source control circuit 1108, a power source 1109, a current amplifier 1110, a servo circuit 1111, a Z direction position control circuit 1112, an XY direction position control circuit 1113, a microcomputer 1114, and a recording determining circuit 1115. The constituting elements of the recording/reproduction apparatus will be described in detail below.

The recording medium 1101 consists of a substrate 1102, a substrate electrode 1103 formed on the substrate 1102, and a recording layer 1104 formed on the substrate electrode 1103, as shown in FIG. 16. The recording layer 1104 is formed using a polyamide LB film which exhibits a memory effect with respect to the switching characteristics of a voltage current, and its conductivity increases upon application of a voltage. More specifically, a recording bit is formed by utilizing the fact that a portion, applied with a voltage from the probe electrode 1106, of the recording layer 1104 locally has a conductivity.

The recording medium 1101 is placed on the recording medium stage 1105. The current amplifier 1110 detects and amplifies a current flowing between the recording medium 1101 and the probe electrode 1106, and outputs the amplified current to the microcomputer 1114, the servo circuit 1111, and the recording determining circuit 1115. The Z direction position control circuit 1112 moves the recording medium driving mechanism 1107 in the Z-axis direction in FIG. 16 in accordance with an output signal from the servo circuit 1111. The XY direction position control circuit 1113 generates a control signal on the basis of an output signal from the microcomputer 1114, and moves the recording medium driving mechanism 1107 in the X- and Y-Axis directions in FIG. 16. Since the recording medium stage 1105 is three-dimensionally moved by driving the recording medium driving mechanism 1107, the recording medium 1101 is three-dimensionally moved. With this operation, the distal end of the probe electrode 1106 can be moved to an arbitrary position on the surface of the recording medium 1101.

The position, in the Z-axis direction in FIG. 16, of the probe electrode 1106 with respect to the recording medium 1101 can be defined by the amplitude of a current flowing between the recording medium 1101 and the probe electrode 1106. The microcomputer 1114 supplies an instruction value of a current to the servo circuit 1111. The servo circuit 1111 compares the supplied instruction value with the amplitude of the current sent from the current amplifier 1110, and supplies an output signal corresponding to the comparison result to the Z direction position control circuit 1112.

The power source 1109 generates a bias voltage required in position control, in the Z-axis direction in FIG. 16, of the probe electrode 1106, and a voltage required for recording information, in accordance with an instruction from the power source control circuit 1108. The recording determining circuit 1115 determines based on the amplitude of the current supplied from the current amplifier 1110 whether or not information recording is achieved, and outputs the result to the power source control circuit 1108 and the microcomputer 1114.

The operation of the recording/reproduction apparatus 1100 will be described below.

When information is recorded, the XY direction position control circuit 1113 supplies a control signal for moving the distal end of the probe electrode 1106 to the recording position on the recording medium 1101 to the recording medium driving mechanism 1107 on the basis of an instruction from the microcomputer 1114. At the same time, the microcomputer 1114 determines a bias voltage required in position control, in the Z-axis direction in FIG. 16, of the probe electrode 1106. The power source control circuit 1108 generates an instruction for generating the bias voltage determined by the microcomputer 1114, and supplies the instruction to the power source 1109. Thus, the bias voltage determined by the microcomputer 1114 is applied across the recording medium 1101 and the probe electrode 1106. A current flowing through the probe electrode 1106 at that time is detected by the current amplifier 1110. At the same time, the microcomputer 1114 determines a prescribed current value corresponding to a predetermined gap between the recording medium 1101 and the probe electrode 1106, and supplies the prescribed current value to the servo circuit 1111.

The servo circuit 1111 compares the value of the current supplied from the current amplifier 1110 with the prescribed current value sent from the microcomputer 1114. If the value of the current supplied from the current amplifier 1110 is larger than the prescribed current value, the servo circuit 1111 generates a control signal for increasing the gap between the recording medium 1101 and the probe electrode 1106; if the value of the current supplied from the current amplifier 1110 is smaller than the prescribed current value, the servo circuit 1111 generates a control signal for decreasing the gap between the recording medium 1101 and the probe electrode 1106. Thereafter, the servo circuit 1111 supplies the control signal to the Z direction position control circuit 1112. As a result, the position of the distal end of the probe electrode 1106 is controlled to have the predetermined gap upon information recording. When the positions of the recording medium 1101 and the probe electrode 1106 are determined, the position control of the probe electrode 1106 is stopped, and the gap between the recording medium 1101 and the probe electrode 1106 is fixed.

Figure 17A:
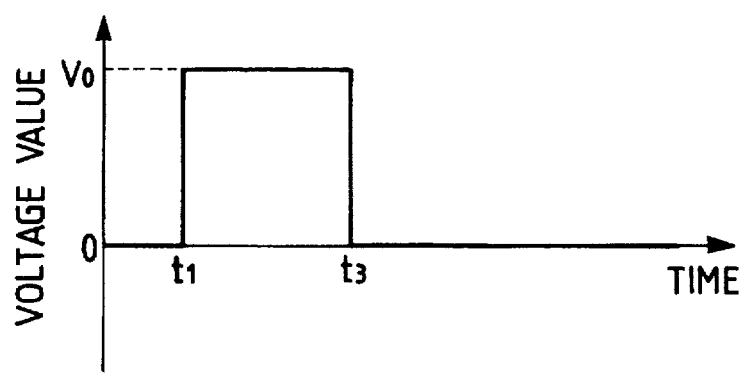

As shown in FIG. 17A, at time $t_1$, the power source control circuit 1108 supplies a control signal for generating a voltage of a voltage value $V_0$ required for recording information to the power source 1109 on the basis of an instruction from the microcomputer 1114. The power source 1109 generates the voltage of the voltage value $V_0$ in accordance with the control signal, and applies the generated voltage to the recording medium 1101. A current flowing between the recording medium 1101 and the probe electrode 1106 at that time is detected and amplified by the current amplifier 1110. The current amplified by the current amplifier 1110 is supplied to the microcomputer 1114 and the recording determining circuit 1115.

Figure 17B:
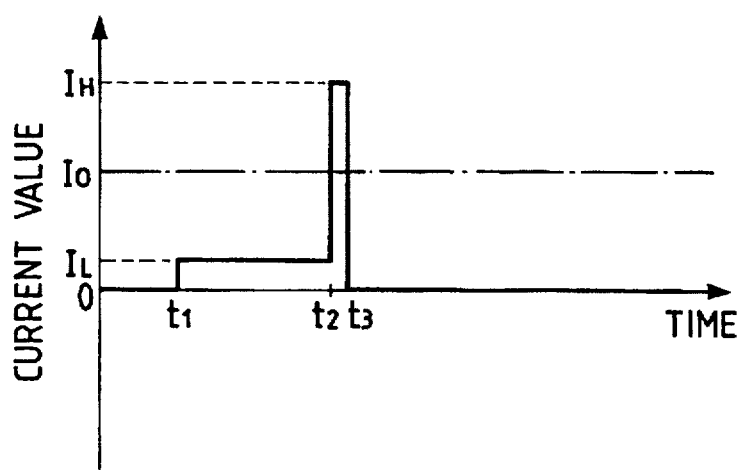

Immediately after the voltage of the voltage value $V_0$ begins to be applied to the recording medium 1101 (time $t_1$), since no recording bit is formed, the value of the current amplified by the current amplifier 1110 is as small as a current value $I_L$, as shown in FIG. 17B. Thereafter, when the voltage of the voltage value $V_0$ is kept applied to the recording medium 1101, the conductivity of the LB film constituting the recording layer 1104 increases, and the value of the current amplified by the current amplifier 1110 becomes as large as a current value $I_H$ at time $t_2$. The recording determining circuit 1115 has a reference current value $I_0$ according to an instruction from the microcomputer 1114, and determines that information recording is achieved when the value of the current supplied from the current amplifier 1110 exceeds the reference current value $I_0$ (time $t_2$). Note that a proper reference current value can always be set by providing the reference current value $I_0$ from the microcomputer 1114. Alternatively, the reference current value $I_0$ may be initially set in the recording determining circuit 1115.

When the recording determining circuit 1115 determines that information recording is achieved, the determining result is supplied from the recording determining circuit 1115 to the microcomputer 1114 and the power source control circuit 1108. When the determining result indicating that information recording is achieved is supplied from the recording determining discrimination circuit 1115 to the power source control circuit 1108, the power source control circuit 1108 supplies a control signal for stopping generation of the voltage of the voltage value $V_O$ to the power source 1109. The power source 1109 stops generation of the voltage of the voltage value $V_O$ in response to this control signal. As a result, voltage application to the recording medium 1101 is stopped at time $t_3$. At this time, the microcomputer 1114 starts control for forming the next recording bit. More specifically, the microcomputer 1114 ends information recording at the current recording position, and starts movement of the probe electrode 1106 to the next recording position. Note that the end of voltage application means the end of application of a voltage for changing the conductivity of the recording layer 1104, and thereafter, a bias voltage or the like may be applied from the power source 1109 to the recording medium 1101, as needed.

With the above-mentioned operation, in the recording/reproduction apparatus 1100, since a voltage required for recording information is applied to the recording medium 1101 during only a sufficient period of time required for recording information, information can be reliably recorded, and damage to the recording medium 1101 upon recording of information can be prevented. Since a sufficient period of time required for recording information can be set, the recording time can also be shortened.

Another example of the operation of the recording/reproduction apparatus 1100 shown in FIG. 16 will be described below with reference to FIGS. 18A and 18B.

In this example, the operations of the power source control circuit 1108 and the microcomputer 1114 upon application of a voltage required for recording information to the recording medium 1101 are different from the above-mentioned operations.

Figure 18A:
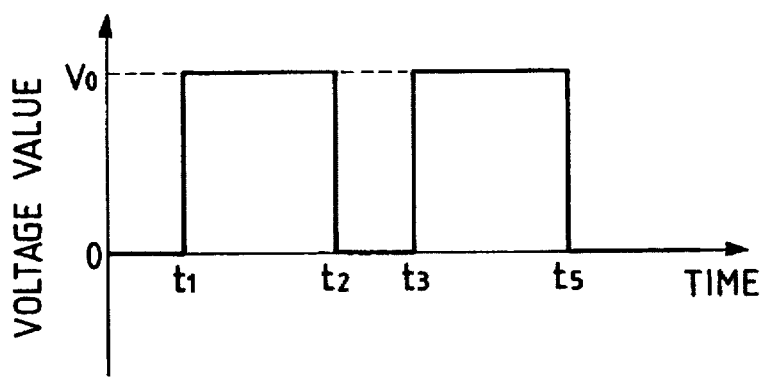

More specifically, as shown in FIG. 18A, a pulse voltage having a voltage value $V_O$ and a constant pulse width is applied from the power source 1109 to the recording medium 1101 from time $t_1$ to time $t_2$. Since the value of the current amplified by the current amplifier 1110 at that time is a current value $I_L$ smaller than the reference current value $I_O$ serving as a reference for determining whether or not information recording is achieved, as shown in FIG. 18B, the recording determining circuit 1115 does not determine that information recording is achieved, and does not supply the determining result indicating that information recording is achieved to the power source control circuit 1108. When the power source control circuit 1108 does not receive any determining result indicating that information recording is achieved from the recording determining circuit 1115 after time $t_2$, it generates a control signal for applying a pulse voltage having a voltage value $V_O$ and a constant pulse width to the recording medium 1101 again, and supplies the control signal to the power source 1109. As a result, the pulse voltage having the voltage value $V_O$ and the constant pulse width is applied from the power source 1109 to the recording medium 1101 again from time $t_3$ to time $t_5$.

Figure 18B:
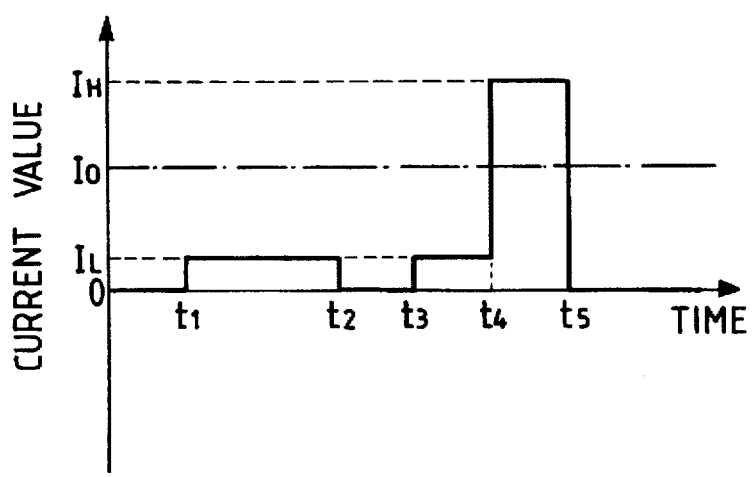

Upon application of the pulse voltage at this time, as shown in FIG. 18B, since the value of the current amplified by the current amplifier 1110 becomes a current value $I_H$ larger than the reference current value $I_O$ at time $t_4$, the recording determining circuit 1115 determines that information recording is achieved. Then, the determining result indicating that information recording is achieved is supplied from the recording determining circuit 1115 to the microcomputer 1114 and the power source control circuit 1108. When the determining result indicating that information recording is achieved is supplied from the recording determining circuit 1115 to the power source control circuit 1108, the power source control circuit 1108 generates a control signal for stopping application of the next pulse voltage, and supplies the control signal to the power source 1109. The microcomputer 1114 waits until time $t_5$ at which application of the pulse voltage ends, and then starts control for forming the next recording bit. More specifically, the microcomputer 1114 ends information recording at the current recording position, and starts movement of the probe electrode 1106 to the next recording position.

Figure 19A:
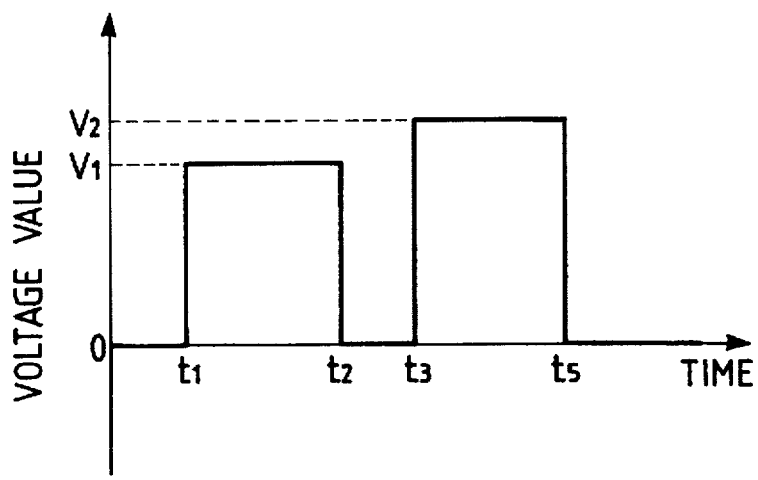

Still another example of the operation of the recording/reproduction apparatus shown in FIG. 16 will be described below with reference to FIGS. 19A and 19B.

In this example, a pulse voltage having a voltage value $V_1$ and a constant pulse width begins to be applied to the recording medium 1101 at time $t_1$. Application of this pulse voltage ends at time $t_2$. However, since the value of the current amplified by the current amplifier 1110 at that time is a current value $I_L$ smaller than the reference current value $I_O$ serving as a reference for judging whether or not information recording is achieved, as shown in FIG. 19B, the recording determining circuit 1115 does not determine that information recording is achieved, and does not supply the result indicating that information recording is achieved to the power source control circuit 1108. When the power source control circuit 1108 does not receive any result indicating that information recording is achieved from the recording determining circuit 1115 after time $t_2$, it generates a control signal for applying a pulse voltage having a voltage value $V_2$ ($V_2 > V_1$) and a constant pulse width to the recording medium 1101 in turn, and supplies the control signal to the power source 1109. As a result, the pulse voltage having the voltage value $V_2$ and the constant pulse width is applied from the power source 1109 to the recording medium 1101 from time $t_3$ to time $t_5$.

Figure 19B:
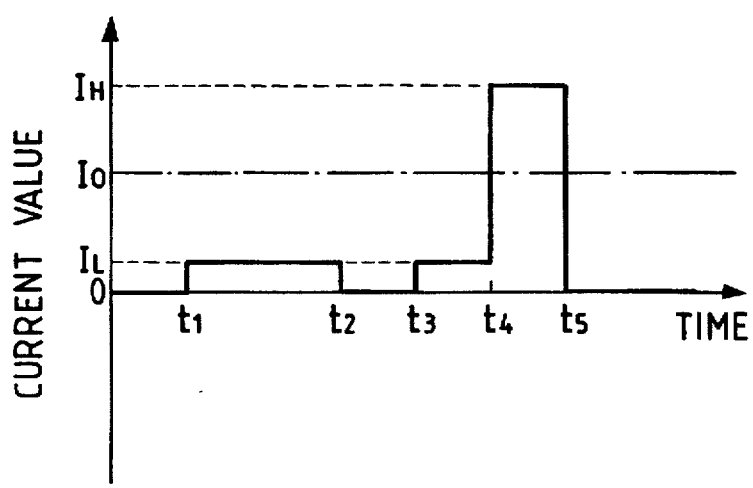

Upon application of the pulse voltage at this time, as shown in FIG. 19B, since the value of the current amplified by the current amplifier 1110 becomes a current value $I_H$ larger than the reference current value $I_O$ at time $t_4$, the recording determining circuit 1115 determines that information recording is achieved. Then, the result indicating that information recording is achieved is supplied from the recording determining circuit 1115 to the microcomputer 1114 and the power source control circuit 1108. When the result indicating that information recording is achieved is supplied from the recording determining circuit 1115 to the power source control circuit 1108, the power source control circuit 1108 generates a control signal for stopping application of the next pulse voltage, and supplies the control signal to the power source 1109. The microcomputer 1114 waits until time $t_5$ at which application of the pulse voltage ends, and then starts control for forming the next recording bit. More specifically, the microcomputer 1114 ends information recording at the current recording position, and starts movement of the probe electrode 1106 to the next recording position.

In this example, upon application of the second pulse voltage from time $t_3$, the voltage value of the pulse voltage is increased. Alternatively, the pulse width of the pulse voltage may be increased.

In each of the examples of the operation described above, recording determining of information is made based on the value of the current amplified by the current amplifier 1110. Alternatively, recording of information may be made based on the differential value of the current. Also, recording of information is made based on the value of the current amplified by the current amplifier 1110 during application of a recording voltage. Alternatively, upon completion of application of the recording voltage, a recording determination voltage may be applied to the recording medium 1101 in addition to the recording voltage, and recording of information may be made based on the value of the current amplified by the current amplifier 1110 at that time. In addition, before application of the recording voltage, a current value in a non-recording state may be sampled, and may be used as a reference value in a recording determination.

Still another example of the operation of the recording/reproduction apparatus 1100 shown in FIG. 16 will be described below with reference to FIGS. 20A and 20B.

Figure 20A:
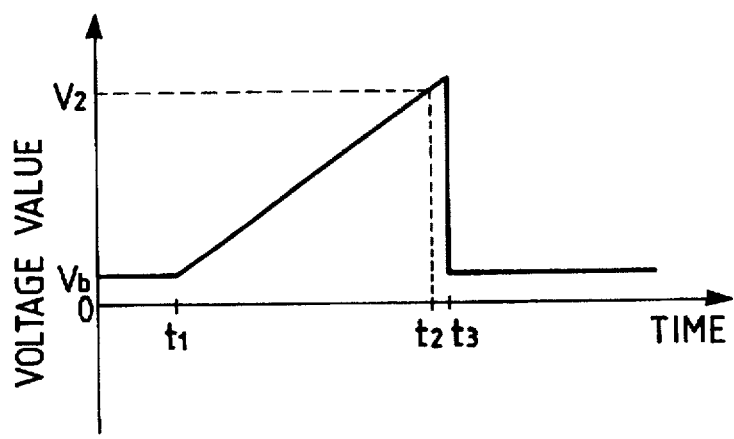
Figure 20B:
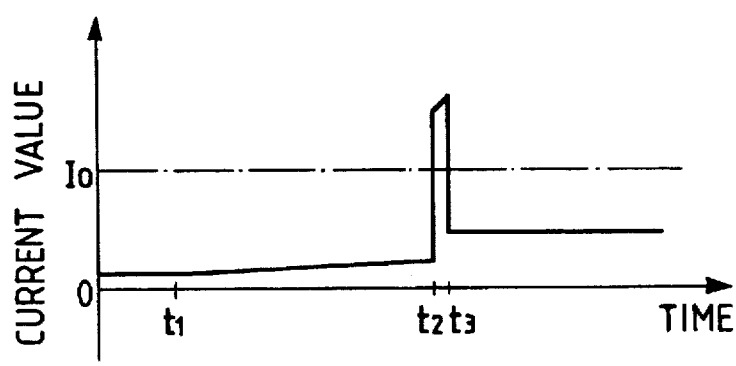

In this example, as shown in FIG. 20A, a bias voltage of a voltage value $V_b$ required for bringing the probe electrode 1106 to be close to the recording medium 1101 is applied from the power source 1109 to the recording medium 1101 before time $t_1$ at which information recording is started. Note that the method of bringing the probe electrode 1106 to be close to the recording medium 1101 is the same as that in the above-mentioned examples. In this manner, when the gap between the probe electrode 1106 and the recording medium 1101 is determined, the power source control circuit 1108 operates at time $t_1$ in accordance with an instruction from the microcomputer 1114, and monotonically increases the value of a voltage to be applied from the power source 1109 to the recording medium 1101. A current flowing between the recording medium 1101 and the probe electrode 1106 is detected and amplified by the current amplifier 1110, and the amplified current is supplied to the recording determining circuit 1115. FIG. 20B shows an example of change, over time, in value of the current amplified by the current amplifier 1110.

The recording determining circuit 1115 determines that information recording is achieved when the value of the current amplified by the current amplifier 1110 exceeds the reference current value $I_0$ (time $t_2$). Thereafter, the result indicating that information recording is achieved is supplied from the recording judgement circuit 1115 to the power source control circuit 1108. Upon reception of this result, the power source control circuit 1108 generates a control signal for stopping application of a voltage required for recording, and supplies the control signal to the power source 1109. Upon reception of this control signal, the power source 1109 stops application of the voltage to the recording medium 1101 at time $t_3$. Thereafter, the probe electrode 1106 is moved to the next recording position in the same manner as in each of the above-mentioned examples, and the next recording operation is started.

[Twelfth Embodiment]

FIGS. 21A to 21E are graphs for explaining the operation of the twelfth embodiment of a recording/reproduction apparatus according to the present invention.

Differences between the recording/reproduction apparatus of this embodiment and the recording/reproduction apparatus 1100 of the eleventh embodiment shown in FIG. 16 are as follows:

(1) A recording medium comprises a silicon (100) substrate (to be referred to as a "silicon substrate" hereinafter).

(2) After a probe electrode is moved to a desired recording position, a voltage is applied across the recording medium and the probe electrode to knock out a silicon atom from the silicon substrate or return the silicon atom which has moved from the silicon substrate to the probe electrode to the silicon substrate, thereby processing the surface of the silicon substrate on the atomic level.

(3) The probe electrode and the silicon substrate are sealed in an ultra-high vacuum, and contaminants such as an oxide film, an organic material, and the like on the surface are removed from the substrate by a pre-treatment. Thus, a clean silicon (100) surface is exposed.

(4) A current amplifier includes a differential circuit, and can output a differential value of a current.

The operation of the recording/reproduction apparatus of this embodiment will be described below while quoting the constituting elements shown in FIG. 16.

After the gap between the probe electrode 1106 and the recording medium 1101 is determined in the same manner as in the recording/reproduction apparatus 1100 shown in FIG. 16, a voltage is applied from the power source 1109 to the recording medium 1101, thereby processing an atom on the surface of the silicon substrate constituting the recording medium 1101. A bias voltage of a voltage value $V_b$ is applied to the recording medium 1101 until time $t_1$ at which information recording is started, and after time $t_1$, a voltage whose voltage value monotonically increases is applied. At this time, a current flowing between the probe electrode 1106 and the recording medium 1101 (silicon substrate) is detected and amplified by the current amplifier 1110. In the current amplifier 1110, since the amplified current is differentiated by the differential circuit, the differential value of the amplified current can be obtained at the same time.

Figure 21A:
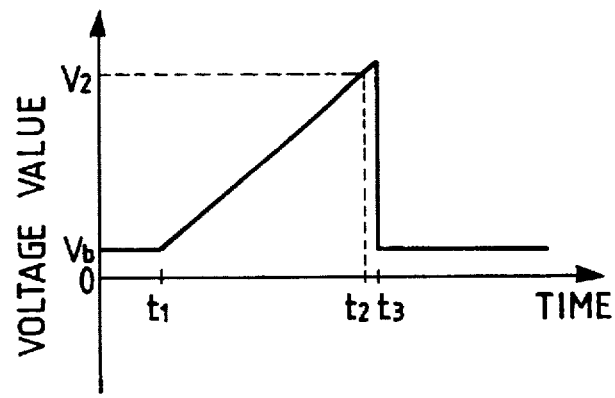
Figure 21B:
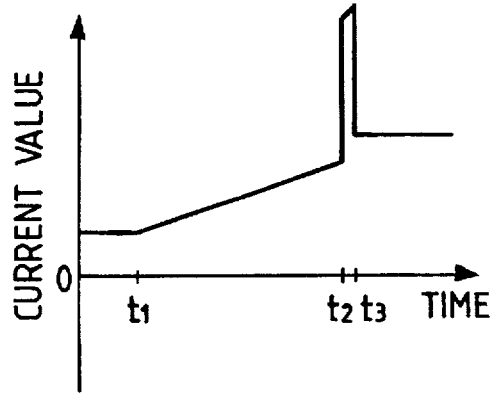
Figure 21C:
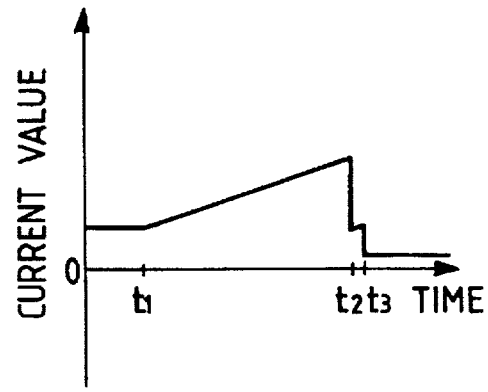

As the value of the voltage to be applied to the recording medium 1101 increases after time $t_1$, the value of the current flowing between the recording medium 1101 and the probe electrode 1106 increases in almost proportion to the voltage value, as shown in FIGS. 21B and 21C. When an atom is knocked out from the silicon substrate constituting the recording medium 1101 or an atom on the distal end of the probe electrode 1106 moves toward the recording medium 1101 side, since the atomic arrangement in a current (tunnel current) flowing region between the distal end of the probe electrode 1106 and the recording medium 1101 (silicon substrate) changes at that instance, a current flowing therebetween abruptly changes. At this time, the current increases or decreases depending on the way of a change in atomic arrangement. FIG. 21B is a graph showing the case wherein the current increases upon a change in the atomic arrangement, and FIG. 21C is a graph showing the case wherein the current decreases upon a change in the atomic arrangement.

Figure 21D:
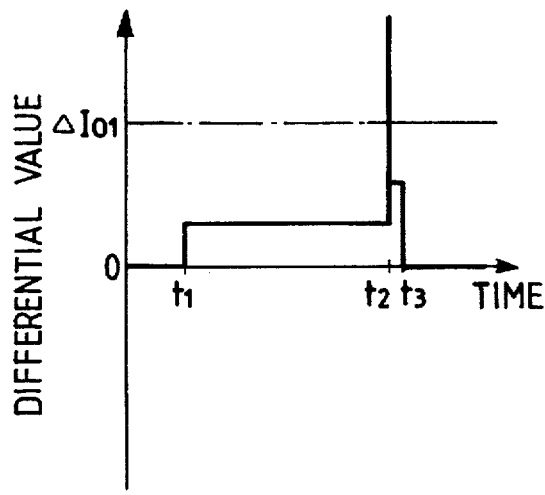
Figure 21E:
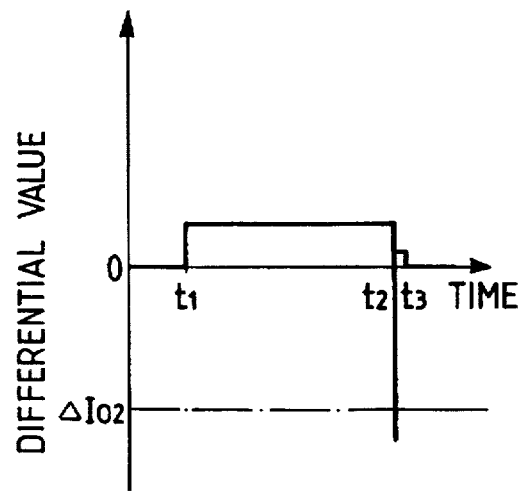

The recording determination circuit 1115 determines movement of an atom (i.e., whether or not information recording is achieved) on the basis of the differential value of the current obtained by the current amplifier 1110. More specifically, when the current abruptly increases at time $t_2$, as shown in FIG. 21B, the differential value of the current abruptly increases, as shown in FIG. 21D. Also, when the current abruptly decreases at time $t_2$, as shown in FIG. 21C, the differential value of the current abruptly decreases, as shown in FIG. 21E. Therefore, in the recording determining circuit 1115, the differential value of the current supplied from the current amplifier 1110 is compared with two reference differential values $\Delta I_{o1}$ and $\Delta I_{o2}$ supplied from the microcomputer 1114. When the differential value of the current becomes larger than one reference differential values $\Delta I_{o1}$ or becomes smaller than the other differential values $\Delta I_{o2}$, the recording determining circuit 1115 determines that an atom or atomic group has moved (i.e., information recording is achieved). In this manner, when the recording determining circuit 1115 determines that information recording is achieved, control for immediately stopping application of a voltage to the recording medium 1101 is performed as in the recording\reproduction apparatus 1100 shown in FIG. 16.

In a conventional recording/reproduction apparatus of this type, a voltage required for moving an atom varies depending on the recording position on the silicon substrate (recording medium 1101). However, in the recording/reproduction apparatus of this embodiment, since the voltage is applied to the silicon substrate (recording medium 1101), as described above, a silicon atom can be more stably moved. In addition, since an excessive voltage is never applied to the silicon substrate (recording medium 1101), unnecessary atoms can be prevented from being influenced by such an excessive voltage.

[Thirteenth Embodiment]

Figure 22:
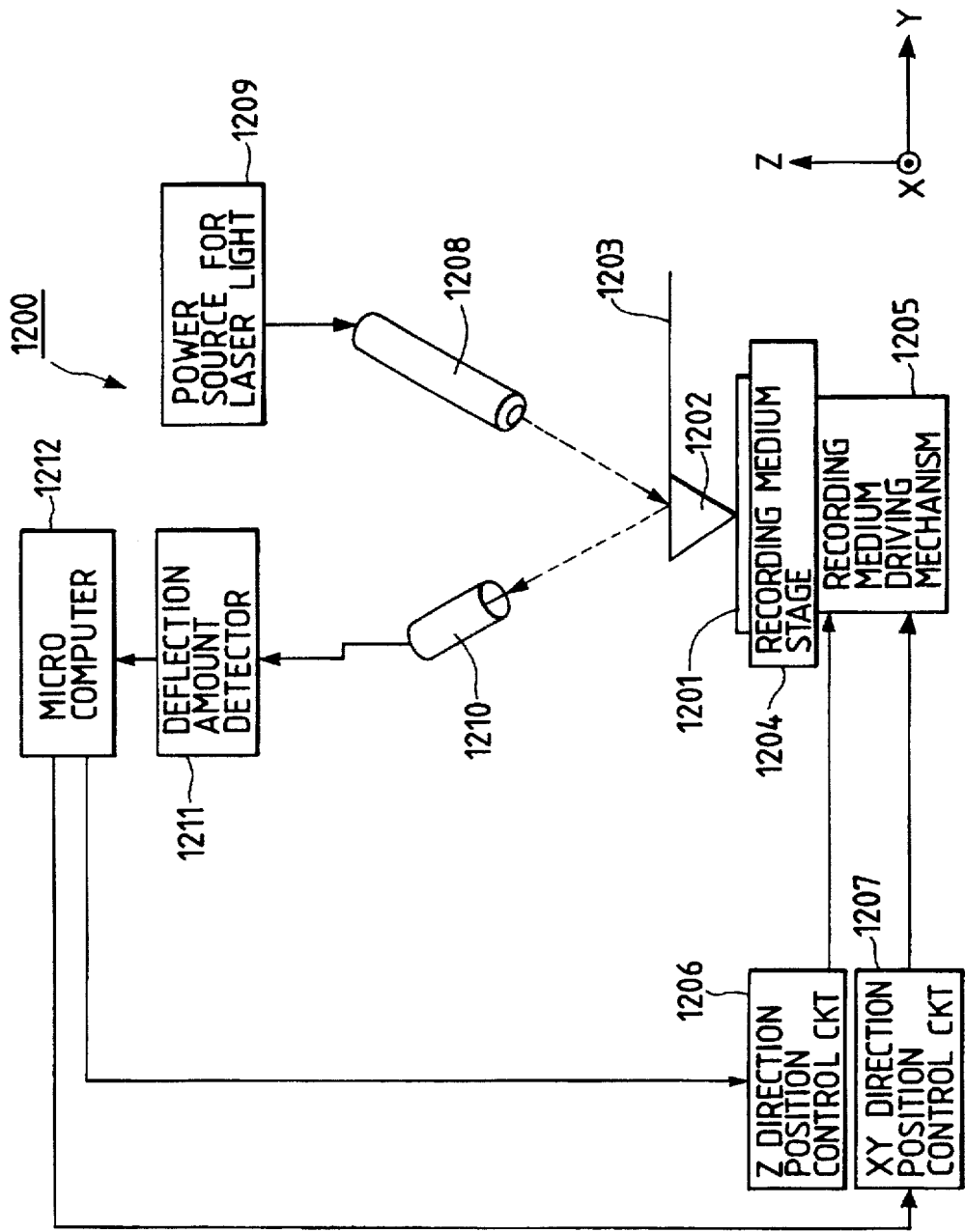
FIG. 22 is a schematic diagram showing the 13th embodiment of the recording/reproduction apparatus according to the present invention.

FIG. 22 is a schematic diagram showing the thirteenth embodiment of the recording/reproduction apparatus according to the present invention.

A recording/reproduction apparatus 1200 of this embodiment adopts the principle of an interatomic force microscope, and forms a recording bit by mechanically processing the surface of a recording medium 1201 with a force applied thereto, thereby recording information. The recording/reproduction apparatus 1200 includes the recording medium 1201, a probe 1202, a cantilever 1203, a recording medium stage 1204, a recording medium driving mechanism 1205, a Z direction position control circuit 1206, an XY direction position control circuit 1207, a laser 1208, a power source 1209 for laser light, a two-split sensor 1210, a deflection amount detector 1211, and a microcomputer 1212.

The cantilever 1203 has the same arrangement as that of a cantilever used in a normal atomic force microscope, and the probe 1202 is fixed to the distal end of the cantilever 1203. The distal end of the probe 1202 contacts the surface of the recording medium 1201.

The recording medium stage 1204 is a mechanism for holding the recording medium 1201. The recording medium driving mechanism 1205 is used for moving the recording medium stage 1204 in the X-, Y-, and Z-axis directions in FIG. 22. The Z direction position control circuit 1206 controls movement, in the Z-axis direction in FIG. 22, of the recording medium driving mechanism 1205, and the XY direction position control circuit 1207 controls movements, in the X- and Y-axis directions in FIG. 22, of the recording medium driving mechanism 1205. Therefore, when the movements, in the X-, Y-, and Z-axis directions in FIG. 22, of the recording medium driving mechanism 1205 are controlled by the Z direction position control circuit 1206 and the XY direction position control circuit 1207, the recording medium 1201 is moved in the X-, Y-, and Z-axis directions in FIG. 22 via the movements of the recording medium stage 1204.

The laser 1208 is used for radiating laser light onto the surface, opposite to the recording medium 1201, of the cantilever 1203. The two-split sensor 1210 is arranged at a position where it can receive laser light reflected by the cantilever 1203. The deflection amount detector 1211 detects the deflection amount of the cantilever 1203 on the basis of the output signal from the two-split sensor 1210, and supplies the detected deflection amount to the microcomputer 1212.

The microcomputer 1212 supplies control signals to the Z direction position control circuit 1206 and the XY direction position control circuit 1207. When the microcomputer 1212 determines based on the deflection amount sent from the deflection amount detector 1211 that the surface of the recording medium 1201 is processed (i.e., information recording is achieved), the microcomputer 1212 operates the Z direction position control circuit 1206 to stop or weaken application of a force to the recording medium 1201 by the probe 1202. Therefore, in the recording/reproduction apparatus 1200 of this embodiment, the microcomputer 1212 also serves as a recording determination means.

The operation of the recording/reproduction apparatus when a structure obtained by stacking a polyamide LB film on an Au film is used as the recording medium 1201 will be described below.

When information is to be recorded, a signal associated with the position, in the X- and Y-axis directions in FIG. 22, of the probe 1202 is supplied from the microcomputer 1212 to the XY direction position control circuit 1207. When a control signal based on this signal is supplied from the XY direction position control circuit 1207 to the recording medium driving mechanism 1205, the recording medium 1201 is moved in the X- and Y-axis directions in FIG. 22, and the distal end of the probe 1202 is moved to a desired recording position on the recording medium 1201. Also, a signal associated with the position, in the Z-axis direction in FIG. 22, of the probe 1202 is supplied from the microcomputer 1212 to the Z direction position control circuit 1206. When a control signal based on this signal is supplied from the Z direction position control circuit 1206 to the recording medium driving mechanism 1205, the position, in the Z-axis direction in FIG. 22, of the distal end of the probe 1202 is determined.

The deflection amount of the cantilever 1203 at that time is calculated by the deflection amount detector 1211. The microcomputer 1212 compares the deflection amount calculated by the deflection amount detector 1211 with a predetermined deflection amount, and generates a control signal for moving the probe 1202 in the Z-axis direction in FIG. 22, so that the two values become equal to each other. The microcomputer 1212 supplies the generated control signal to the Z direction position control circuit 1206. The Z direction position control circuit 1206 generates a control signal for moving the recording medium driving mechanism 1205 in the Z-axis direction in FIG. 22 in accordance with the control signal from the microcomputer 1212. When this control signal is supplied from the Z direction position control circuit 1206 to the recording medium driving mechanism 1205, the positions, in the Z-axis direction in FIG. 22, of the recording medium 1201 and the probe 1202 (i.e., a force to be applied from the probe 1202 to the recording medium 1201) are adjusted. At this time, in general, the positions, in the Z-axis direction in FIG. 22, of the recording medium 1201 and the probe 1202 are adjusted, so that the distal end of the probe 1202 just contacts the surface of the recording medium 1201.

Figure 23A:
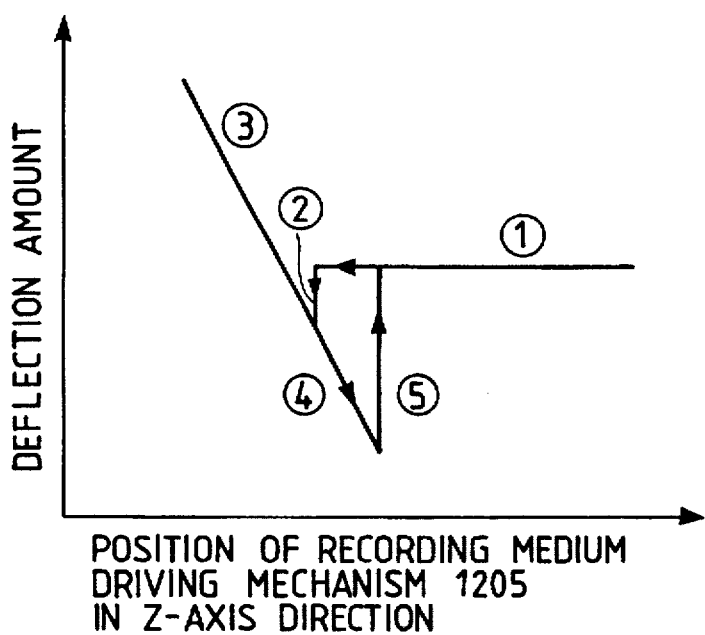
Figure 23B:
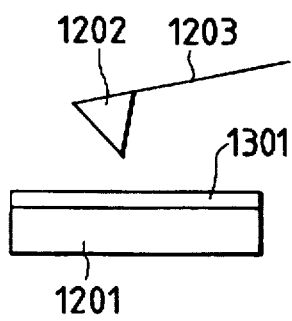

FIG. 23A shows the experimental result of the relationship between the position, in the Z-axis direction in FIG. 22, of the recording medium driving mechanism 1205 and the deflection amount detected by the deflection amount detector 1211. The result shown in this graph is generally called a force curve. Note that the abscissa represents the position, in the Z-axis direction, of the recording medium driving mechanism 1205, and the recording medium 1201 and the support portion of the cantilever 1203 are separated from each other move toward the right side of the abscissa in FIG. 23A. Also, the ordinate represents the deflection amount detected by the deflection amount detector 1211, and the cantilever 1203 is bent upward in FIG. 22 by a larger amount, i.e., the probe 1202 receives a stronger upward force in FIG. 22 toward the upper side of the ordinate in FIG. 23A. This force curve reveals the following facts. In the following interpretations, assume that an adsorption layer 1301 is formed on the surface of the recording medium 1201.

Figure 23C:
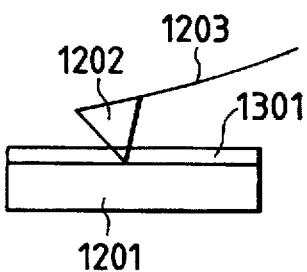
Figure 23D:
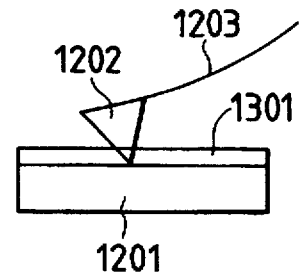

When the recording medium driving mechanism 1205 is located at a position indicated by ① in FIG. 23A, the probe 1202 and the recording medium 1201 are sufficiently separated from each other. From this state, when the recording medium driving mechanism 1205 is driven in the direction to cause the recording medium 1201 and the probe 1202 to approach each other, the probe 1202 contacts the surface of the recording medium 1201 by an interaction with the recording medium 1201, i.e., "jump" occurs, as shown in FIG. 23C, at a position indicated by ② in FIG. 23A. When the recording medium driving mechanism 1205 is further driven in the same direction, and reaches a position indicated by ③ in FIG. 23A, the cantilever 1203 deflects, as shown in FIG. 23D. When the recording medium driving mechanism 1205 is moved in the Z-axis direction in this state, the magnitude of a force applied from the distal end of the probe 1202 to the surface of the recording medium 1201 can be adjusted.

Figure 23E:
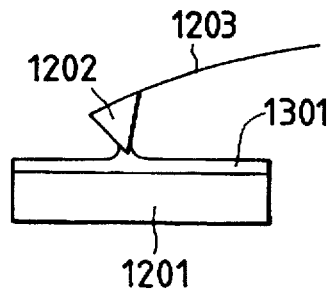
Figure 23F:
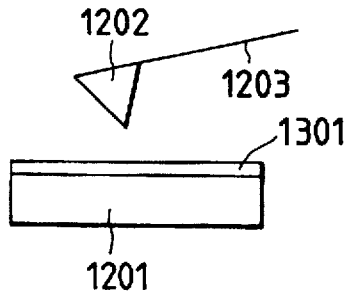

Subsequently, when the recording medium driving mechanism 1205 is driven in the opposite direction so that the recording medium 1201 and the probe 1202 are separated from each other, and reaches a position indicated by ④ in FIG. 23A, the distal end of the probe 1202 is set in a state shown in FIG. 23E since the adsorption layer 1301 applies, to the probe 1202, a force in a direction to pull back the distal end of the probe 1202 toward the recording medium 1201. When the recording medium driving mechanism 1205 is driven in the opposite direction so that the recording medium 1201 and the probe 1202 are further separated from each other, the distal end of the probe 1202 is released from the recording medium 1201, as shown in FIG. 23F, at an instance when the recording medium driving mechanism 1205 reaches a position indicated by ⑤ in FIG. 23A.

In the recording/reproduction apparatus 1200 of this embodiment, the distal end of the probe 1202 is set to contact the surface of the recording medium 1201, as shown in FIG. 23C, or to be slightly pressed against the surface of the recording medium 1201. Note that the magnitude of a force applied from the distal end of the probe 1202 to the recording medium 1201 is set to be a magnitude with which the surface of the recording medium 1201 is not physically processed, i.e., a magnitude with which bonded molecules on the surface of the LB film can be prevented from being dissociated.

After the probe 1202 is brought into contact with the recording medium 1201, when the Z direction position control circuit 1206 operates according to an instruction from the microcomputer 1212, the recording medium driving mechanism 1205 is driven in the direction to cause the recording medium 1201 and the probe 1202 to approach each other. With this operation, the cantilever 1203 deflects, and the distal end of the probe 1202 is pressed against the surface of the recording medium 1201 by a force produced by the deflection of the cantilever 1203. The probe 1202 mechanically processes the surface of the recording medium 1201 by a force produced when the distal end of the probe 1202 is pressed against the recording medium 1201.

Figure 24A:
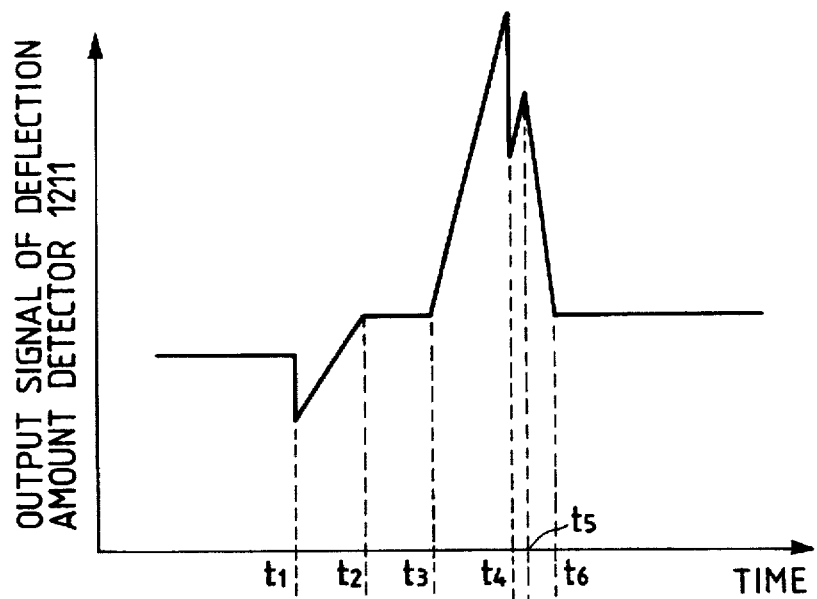
Figure 24B:
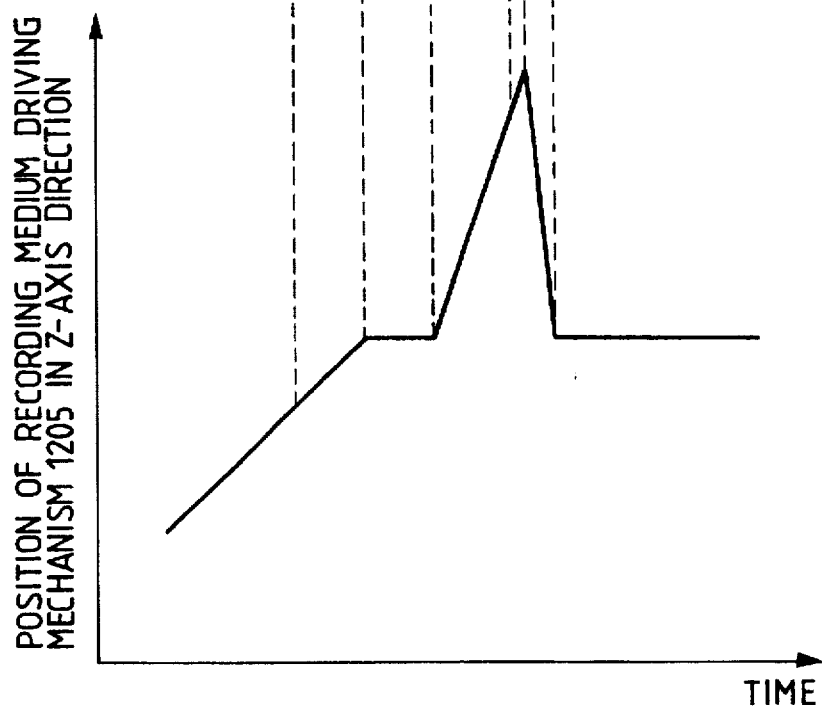

FIG. 24A is a graph showing a change, over time, in the deflection amount detected by the deflection amount detector 1211, and FIG. 24B is a graph showing a change, over time, in the position, in the Z-axis direction in FIG. 22, of the recording medium driving mechanism 1205. In FIG. 24B, toward the upper side of the ordinate in FIG. 24B, the recording medium 1201 and the probe 1202 become closer to each other.

As described above, the distal end of the probe 1202 is brought into contact with the surface of the recording medium 1201 at time $t_1$. Thereafter, the microcomputer 1212 calculates a force acting between the recording medium 1201 and the probe 1202 on the basis of an output signal from the deflection amount detector 1211, and generates an instruction signal for performing position adjustment of the recording medium driving mechanism 1205 until the calculated force becomes equal to a prescribed value. The microcomputer 1212 supplies the instruction signal to the Z direction position control circuit 1206.

If the force acting between the recording medium 1201 and the probe 1202 has reached the prescribed value at time $t_2$, the microcomputer 1212 generates an instruction signal for performing position adjustment of the recording medium driving mechanism 1205, so that the distal end of the probe 1202 applies a force to the recording medium 1201, and supplies the instruction signal to the Z direction position control circuit 1206. At time $t_3$, the operation of the recording medium driving mechanism 1205 is started, and the recording medium 1201 begins to move, as shown in FIG. 24B. As the time lapses, the force applied from the distal end of the probe 1202 to the recording medium 1201 increases. When a hole is formed in the LB film at time $t_4$, the output signal from the deflection amount detector 1211 abruptly changes, as shown in FIG. 24A. More specifically, since a hole is formed in the LB film, the distal end of the probe 1202 is moved to the surface of the Au film, and the output signal from the deflection amount detector 1211 abruptly changes.

The microcomputer 1212 determines based on the abrupt change in output signal from the deflection amount detector 1211 that the surface of the LB film is processed, and generates an instruction signal for separating the recording medium 1201 and the probe 1202 from each other so as to stop application of the force at time $t_5$. The microcomputer 1212 supplies the instruction signal to the Z direction position control circuit 1206. When the recording medium driving mechanism 1205 is driven by the Z direction position control circuit 1206 in accordance with this instruction signal, the recording medium 1201 and the probe 1202 are separated from each other until the output signal from the deflection amount detector 1211 reaches the prescribed value. Note that the prescribed value is preferably set to be a value at which the recording medium 1201 and the probe 1202 are not separated from each other upon movement to the next recording position, and the probe 1202 applies a force with a magnitude which does not destroy the LB film. A time interval from time $t_4$ to time $t_5$ corresponds to the delay time of the recording/reproduction apparatus 1200, and it is preferable that the delay time be as short as possible.

In each of the above-mentioned embodiments of the recording/reproduction apparatus of the present invention, information is recorded by forming a recording bit on the recording medium, and at the same time, the recorded information is reproduced. Similarly, the same effect as described above can be obtained even in a recording apparatus which has only a function of recording information, and does not have any reproduction function of recorded information. Also, the same effect can be expected when the present invention is applied to an apparatus which performs fine processing on the order of nanometers using a scanning probe microscope (SPM).

What is claimed is:

1. An information recording method for forming a recording bit having a physical state different from the circumference on a recording medium in accordance with information, comprising the steps of:

applying a physical action with a predetermined condition to the recording medium to form the recording bit;

measuring a physical quantity of a portion, to which the physical action is applied, of the recording medium;

confirming formation of the recording bit on the basis of the measured physical quantity; and reforming the recording bit by applying the physical action with a condition different from the predetermined condition, to the portion, if not confirmed in said confirming step that the recording bit is formed at the portion.

2. A method according to claim 1, wherein said step of applying the physical action includes the step of applying a voltage.

3. A method according to claim 2, wherein the physical quantity is a current generated in the portion, to which the physical action is applied, of said recording medium.

4. A method according to claim 3, wherein the current is measured after application of the voltage.

5. A method according to claim 1, wherein the step of applying the physical action includes the step of injecting a current.

6. A method according to claim 5, wherein the physical quantity is a voltage generated in the portion, to which the physical action is applied, of said recording medium.

7. A method according to claim 6, wherein the voltage is measured after the injection of current.

8. An information recording apparatus for forming a recording bit having a physical state different from the circumference on a recording medium in accordance with information, comprising:

means for applying a physical action with a predetermined condition to the recording medium to form the recording bit;

means for measuring a physical quantity of a portion, to which the physical action is applied, of the recording medium;

means for confirming formation of the recording bit on the basis of the measured physical quantity; and means for reforming the recording bit by applying the physical action with a condition different from the predetermined condition, to the portion, if said confirming means confirms does not confirm that the recording bit is not formed at the portion.

9. An apparatus according to claim 8, wherein said means for applying the physical action applies a voltage to the recording medium.

10. An apparatus according to claim 9, wherein the physical quantity is a current generated in the portion, to which the physical action is applied, of the recording medium.

11. An apparatus according to claim 10, wherein the current is measured after application of the voltage.

12. An apparatus according to claim 8, wherein said means for applying the physical action includes means for injecting a current.

13. An apparatus according to claim 12, wherein the physical quantity is a voltage generated in the portion, to which the physical action is applied, of the recording medium.

14. An apparatus according to claim 13, wherein the voltage is measured after the injection of the current.

15. An information recording method for forming a recording bit on a recording medium in accordance with information, comprising the steps of:

applying a physical action with a predetermined condition to the recording medium to form the recording bit;

measuring a physical quantity of a portion, to which the physical action is applied, of the recording medium, while the physical action is applied to the portion to form the recording bit; and confirming formation of the recording bit on the basis of the measured physical quantity.

16. An information recording method according to claim 15, wherein said step of applying the physical action is stopped when it is confirmed in said confirming step that the recording bit is formed.

17. A method according to claim 16, wherein said step of applying the physical action includes the step of applying a voltage.

18. A method according to claim 17, wherein said physical quantity is a current generated in the portion, to which the physical action is applied, of said recording medium.

19. A method according to claim 16, wherein said step of applying the physical action includes the step of injecting a current.

20. A method according to claim 19, wherein said physical quantity is a voltage generated in the portion, to which said physical action is applied, of said recording medium.

21. A method according to claim 15, wherein said step of applying the physical action includes the step of applying a voltage.

22. A method according to claim 21, wherein said physical quantity is a current generated in the portion, to which the physical action is applied, of said recording medium.

23. A method according to claim 15, wherein said step of applying the physical action includes the step of injecting a current.

24. A method according to claim 23, wherein said physical quantity is a voltage generated in the portion, to which said physical action is applied, of said recording medium.

25. An information recording apparatus for forming a recording bit on a recording medium, comprising:

means for applying a physical action with a predetermined condition to the recording medium to form the recording bit;

means for measuring a physical quantity of a portion, to which the physical action is applied, of the recording medium, while the physical action is applied to the portion to form the recording bit; and means for confirming formation of the recording bit on the basis of the measured physical quantity.

26. An information recording apparatus according to claim 25, wherein application of the physical action by said applying means is stopped when said confirming means confirms that the recording bit is formed.

27. An apparatus according to claim 26, wherein said means for applying the physical action included means for applying a voltage.

28. An apparatus according to claim 27, wherein said physical quantity is a current generated in the portion, to which the physical action is applied, of said recording medium.

29. An apparatus according to claim 26, wherein said means for applying the physical action includes means for injecting a current.

30. An apparatus according to claim 29, wherein said physical quantity is a voltage generated in the portion, to which said physical action is applied, of said recording medium.

31. An apparatus according to claim 25, wherein said means for applying the physical action include means for applying a voltage.

32. An apparatus according to claim 31, wherein said physical quantity is a current generated in the portion, to which the physical action is applied, of said recording medium.

33. An apparatus according to claim 25, wherein said means for applying the physical action includes means for injecting a current.

34. An apparatus according to claim 33, wherein said physical quantity is a voltage generated in the portion, to which said physical action is applied, of said recording medium.

* * * * *

UNITED STATES PATENT AND TRADEMARK OFFICE
CERTIFICATE OF CORRECTION

PATENT NO. : 5,732,053
DATED : March 24, 1998
INVENTOR(S) : KOJI YANO, ET AL.

It is certified that error appears in the above-identified patent and that said Letters Patent is hereby corrected as shown below:

ON THE COVER PAGE

At [54], Title

"METHOD" should read --METHOD AND--.

COLUMN 4

Line 12, "the." should read --the--.

COLUMN 5

Line 2, "instructions" should read --instruction--.

COLUMN 9

Line 63, "same," should read --same time,--.

UNITED STATES PATENT AND TRADEMARK OFFICE
CERTIFICATE OF CORRECTION

PATENT NO. : 5,732,053
DATED : March 24, 1998
INVENTOR(S) : KOJI YANO, ET AL.

It is certified that error appears in the above-identified patent and that said Letters Patent is hereby corrected as shown below:

COLUMN 21

Line 22, "instrutions" should read --instruction--.

COLUMN 22

Line 49, "Value" should read --value--.

COLUMN 34

Line 33, "in almost" should read --almost in--.

COLUMN 39

Line 48, "confirms" should be deleted.
Line 49, delete "not".

Signed and Sealed this

Eleventh Day of August 1998

Attest:

BRUCE LEHMAN

Attesting Officer     Commissioner of Patents and Trademarks